United States Patent
Taguchi

(10) Patent No.: US 10,362,209 B2
(45) Date of Patent: Jul. 23, 2019

(54) OPERATION INPUT DEVICE, IMAGE DISPLAY DEVICE, CENTRALIZED OPERATION APPARATUS, AND IMAGING SYSTEM

(71) Applicant: JVC KENWOOD CORPORATION, Yokohama-shi, Kanagawa (JP)

(72) Inventor: Hiromi Taguchi, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 0 days.

(21) Appl. No.: 15/884,967

(22) Filed: Jan. 31, 2018

(65) Prior Publication Data
US 2018/0183983 A1 Jun. 28, 2018

Related U.S. Application Data

(63) Continuation of application No. PCT/JP2016/070223, filed on Jul. 8, 2016.

(30) Foreign Application Priority Data

Jul. 31, 2015 (JP) .................................. 2015-152459
Jun. 10, 2016 (JP) .................................. 2016-115949

(51) Int. Cl.
*H04N 5/232* (2006.01)
*H04N 5/225* (2006.01)
(Continued)

(52) U.S. Cl.
CPC ........... *H04N 5/232* (2013.01); *H04N 5/2252* (2013.01); *H04N 5/2253* (2013.01);
(Continued)

(58) Field of Classification Search
CPC .... H04N 5/232; H04N 5/2253; H04N 5/2252; H04N 5/2257; H04N 7/183; H05K 5/02
See application file for complete search history.

(56) References Cited

U.S. PATENT DOCUMENTS 5,894,322 A * 4/1999 Hamano ............ A61B 1/00006
                                                    348/65
8,189,043 B2 * 5/2012 Schneider .......... A61B 1/00124
                                                    348/82

(Continued)

FOREIGN PATENT DOCUMENTS

JP      10-98635 A      4/1998
JP      3345946 A       11/2002
(Continued)

OTHER PUBLICATIONS

PCT/ISA/237 dated Sep. 20, 2016 issued in corresponding International Application No. PCT/JP2016/070223.

*Primary Examiner* — Luong T Nguyen
(74) *Attorney, Agent, or Firm* — Nath, Goldberg & Meyer; Jerald L. Meyer

(57) ABSTRACT

An operation portion is provided on a first surface of a housing and is operated to remotely operate an imaging device. A signal transmitting and receiving portion is provided on a second surface of the housing connected to the first surface, and is configured to transmit and receive a signal to and from the imaging device. An electrical connection portion is attached to the first surface of the housing or to a surface of the housing facing the same direction as the first surface, and is configured to output a signal, which is received from the imaging device through the signal transmitting and receiving portion, to the outside. Engaging pieces are retractably provided at positions facing each other with the operation portion interposed therebetween, on a third surface and a fourth surface connected to both the first surface and the second surface.

4 Claims, 16 Drawing Sheets

(51) Int. Cl.
*H05K 5/02* (2006.01)
*H04N 7/18* (2006.01)
(52) U.S. Cl.
CPC ........... *H04N 5/2257* (2013.01); *H04N 7/183* (2013.01); *H05K 5/02* (2013.01)

(56) References Cited

U.S. PATENT DOCUMENTS

2003/0175010 A1* 9/2003 Nomura ............... H04N 1/0044
386/248
2005/0122416 A1* 6/2005 Ryu ..................... H04N 5/2252
348/333.07

FOREIGN PATENT DOCUMENTS

| JP | 2007-5915 A | 1/2007 |
| JP | 2007-60268 A | 3/2007 |

* cited by examiner

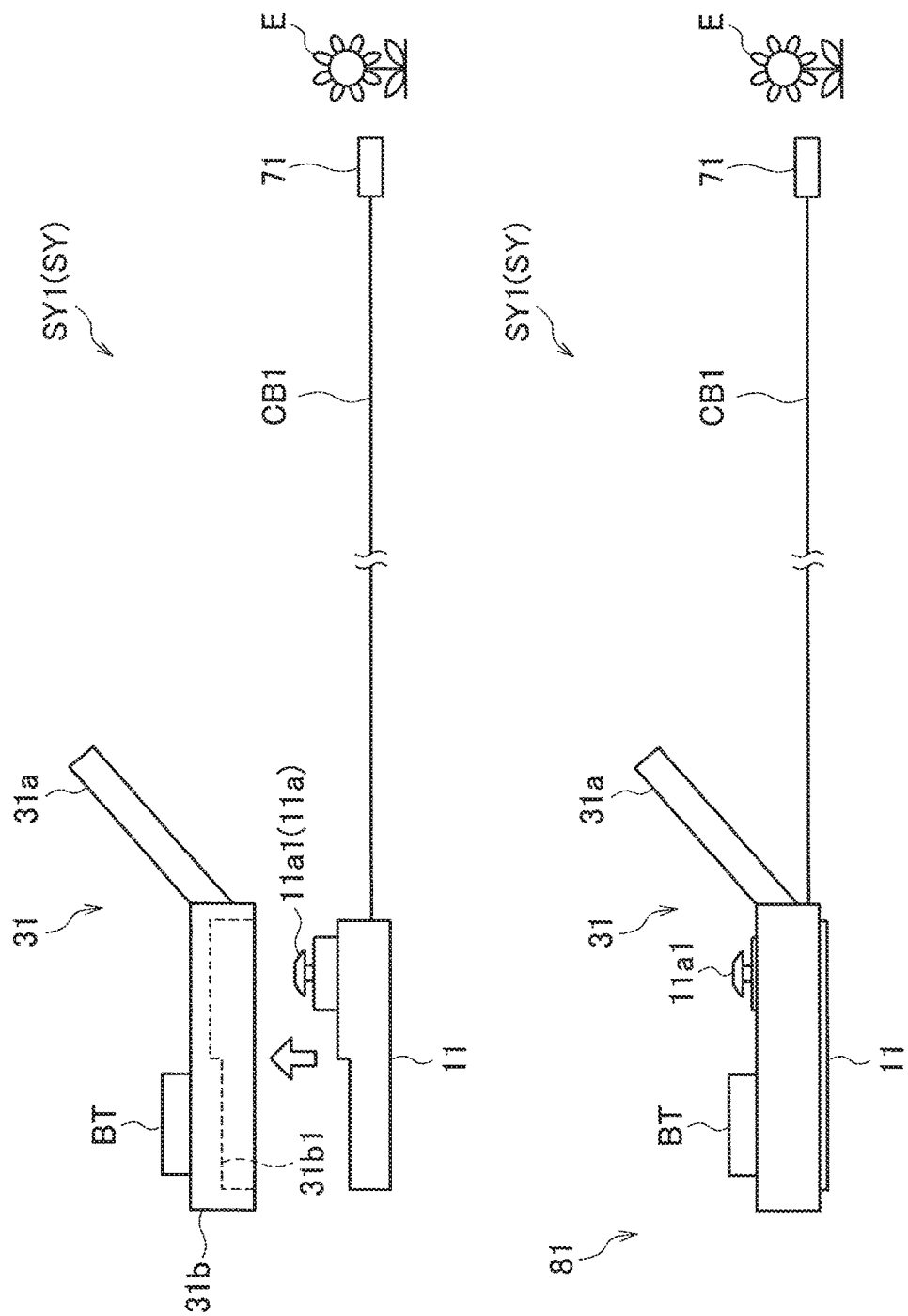

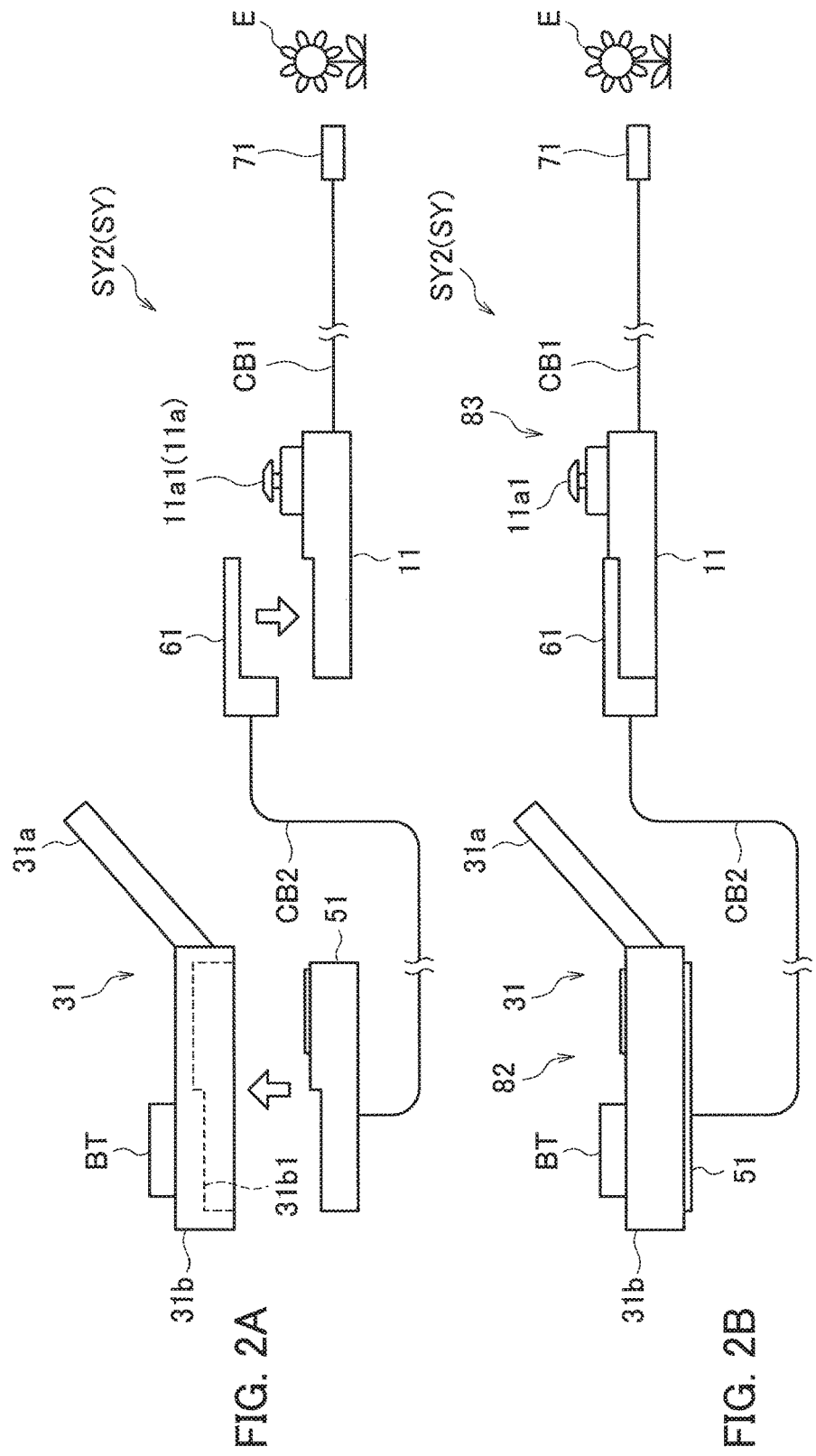

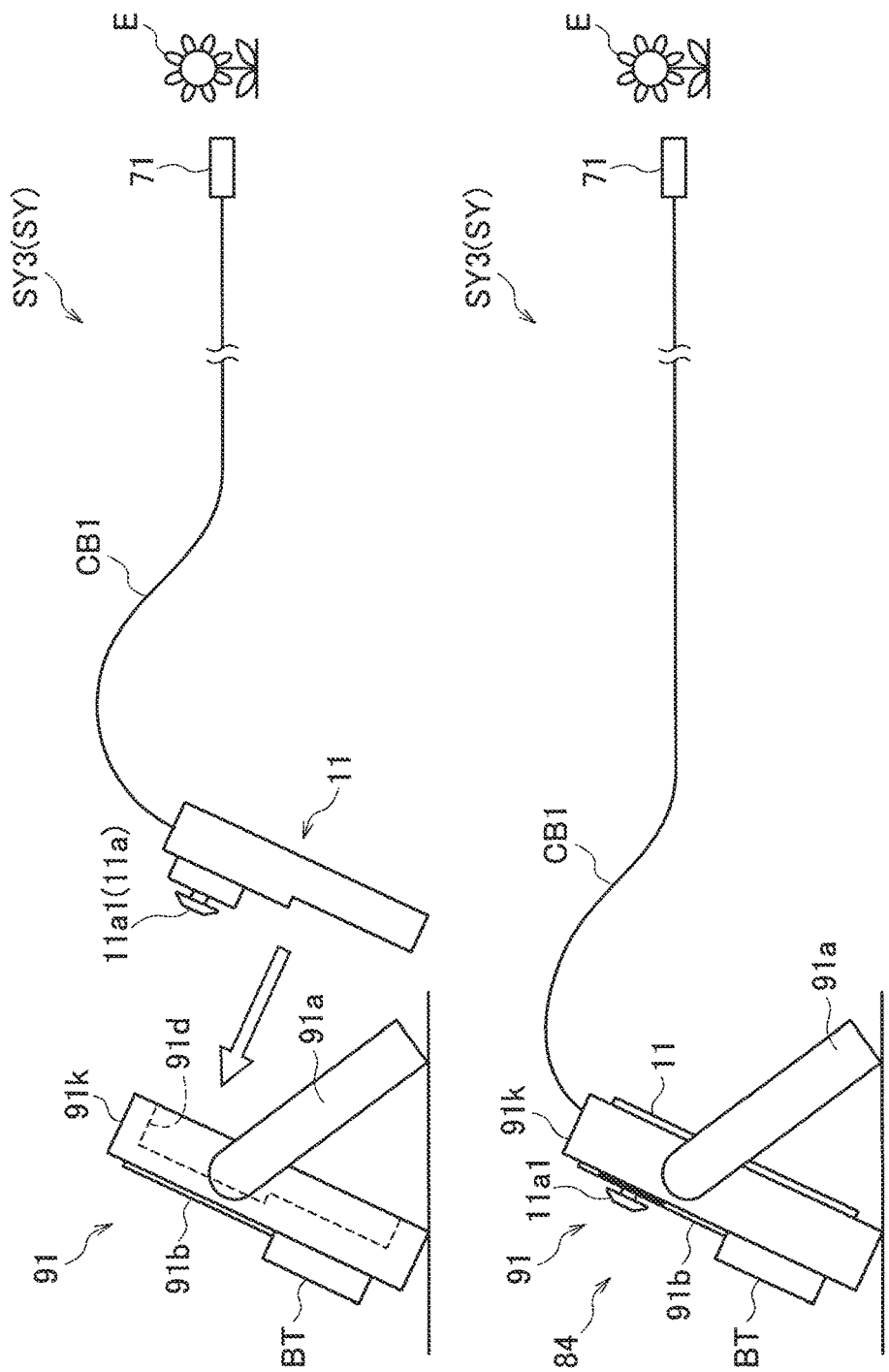

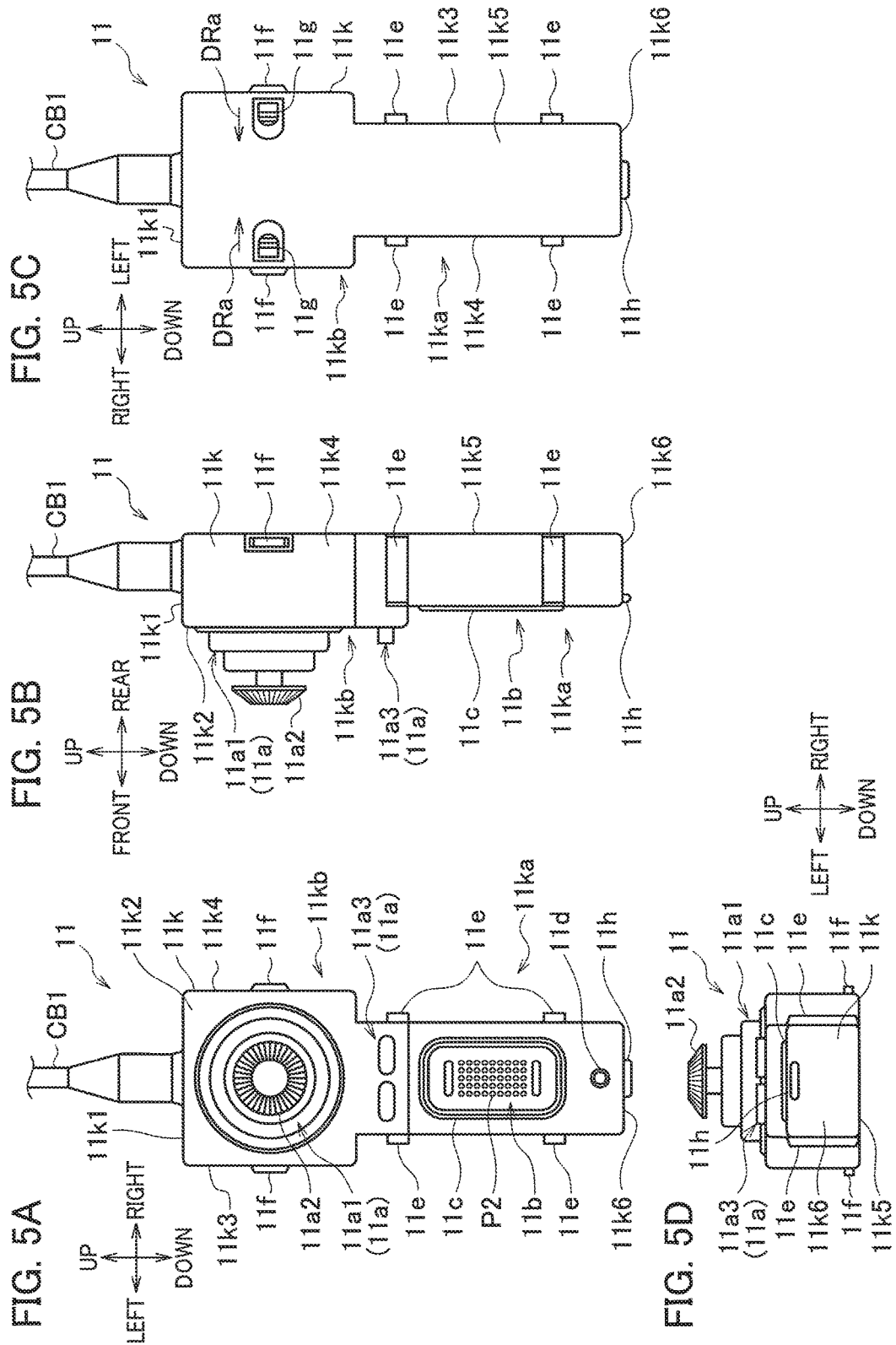

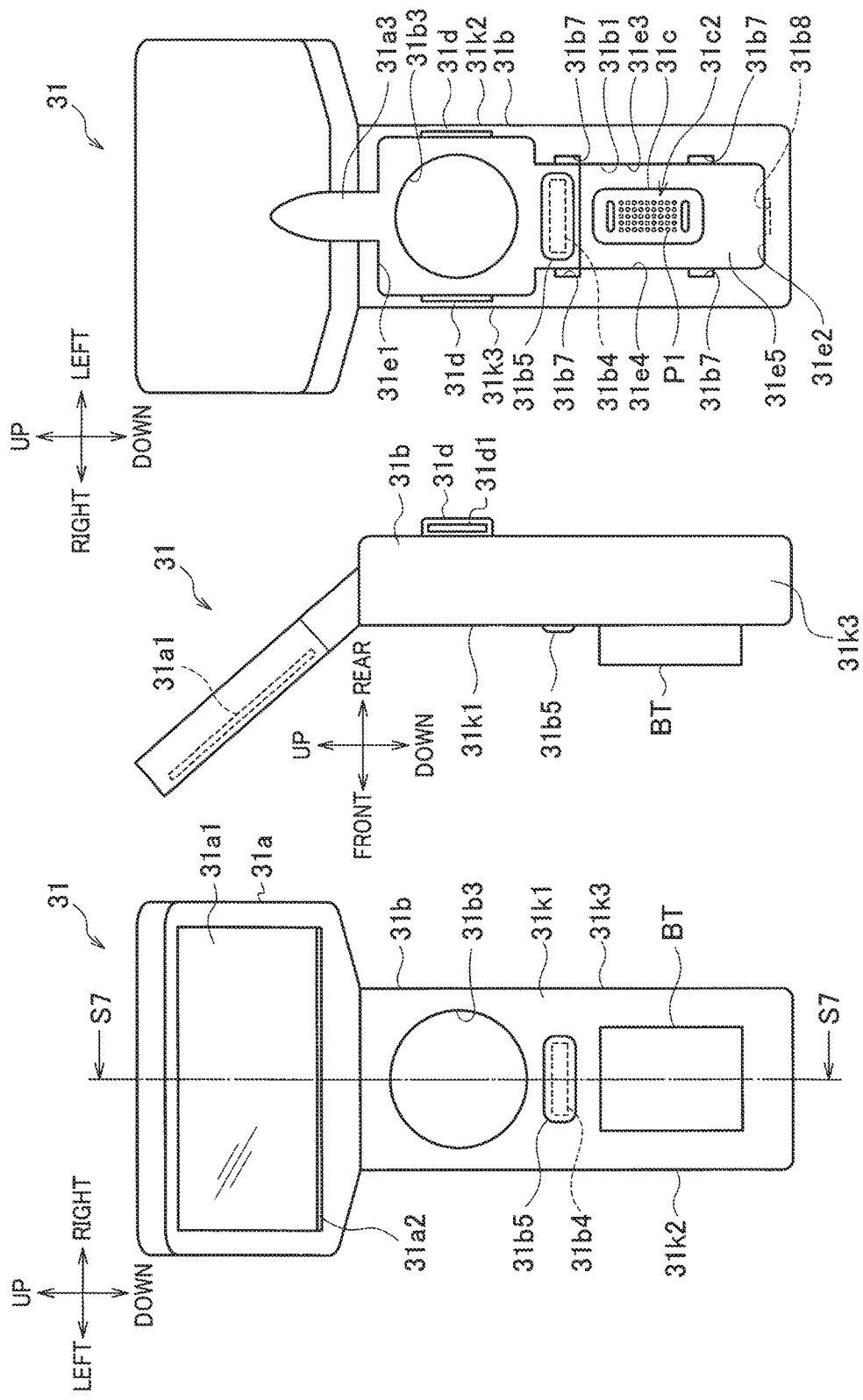

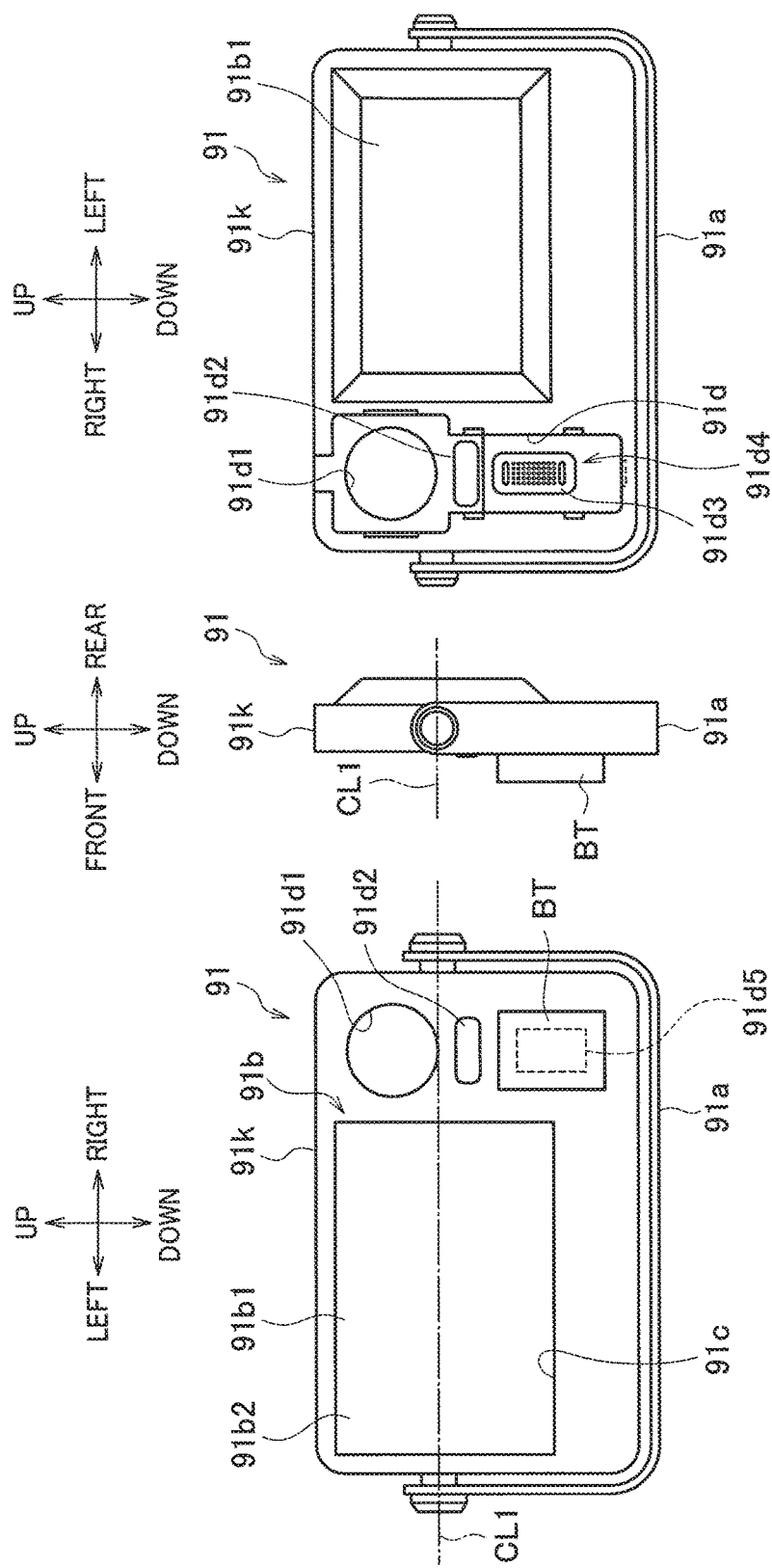

OPERATION INPUT DEVICE, IMAGE DISPLAY DEVICE, CENTRALIZED OPERATION APPARATUS, AND IMAGING SYSTEM

CROSS REFERENCE TO RELATED APPLICATION

This application is a Continuation of PCT Application No. PCT/JP2016/070223, filed on Jul. 8, 2016, and claims the priority of Japanese Patent Application No. 2015-152459, filed on Jul. 31, 2015, and Japanese Patent Application No. 2016-115949, filed on Jun. 10, 2016, the entire contents of all of which are incorporated herein by reference.

BACKGROUND

The present disclosure relates to an operation input device, an image display device, a centralized operation apparatus, and an imaging system.

Recently, regarding an imaging device and an imaging system including an imaging device, high image quality and reduction in size and weight have been realized. Therefore, an object can be imaged under conditions or in environments where an object cannot be imaged in the conventional art, and the use of an imaging device and an imaging system has increased. For example, an imaging device that is mounted on a remote-operated robot, an unmanned aerial vehicle or the like is used for imaging an object by remote operation in a place where people cannot enter or at an angle at which the object cannot be imaged by people.

For use where a remote operation is required as described above, an imaging device, an operation input device, and an image display device are disposed distant from each other in a state where they can communicate with each other by wire or wirelessly, the operation input device operating the imaging device and a moving object or the like on which the imaging device is mounted, and the image display device displaying an image captured by the imaging device.

Japanese Patent No. 3345946 (Patent Document 1) discloses a camcorder that is an imaging system in which an operation input device and an image display device are disposed distant from each other, the operation input device remotely and wirelessly operating an imaging device, and the image display device displaying an image captured by the imaging device. In the imaging system described in Patent Document 1, a recessed mounting portion is provided on an operation surface of the operation input device such that the image display device is detachable from the mounting portion. As a result, the imaging system can be used in a state where the operation input device and the image display device are integrated or separated.

According to the technique described in Patent Document 1, whether the operation input device and the image display device are integrated or separated can be selected depending on the mode of use of a remote operation. For example, by integrating the operation input device and the image display device into a handy device, an operator can perform a remote operation and image observation simultaneously while standing.

SUMMARY

Incidentally, regarding a display device used in an image display device, in recent years, reduction in size and weight has been realized and power consumption has been reduced as compared to the conventional art, assuming that the image display sizes are the same. As a result, the screen size of a handy image display device can increase. Conversely, the size of an operation input device has been reduced along with integration and densification of an input device or a signal processing device.

In addition, an imaging system has been widely used for business, and thus an imaging system for business use is required. That is, higher reliability is required for an imaging system for business use. For example, a housing structure that has high drop impact strength and is not likely to be broken, and superior environment resistance (waterproof, drip-proof, or dustproof) are required.

A first aspect of the embodiment provides an operation input device including: a housing; an operation portion that is provided on a first surface of the housing and is operated to remotely operate an imaging device; a signal transmitting and receiving portion that is provided on a second surface of the housing connected to the first surface, and configured to transmit and receive a signal to and from the imaging device; a first electrical connection portion that is attached to the first surface of the housing or to a surface of the housing facing a same direction as the first surface, and configured to output a signal, which is received from the imaging device through the signal transmitting and receiving portion, to the outside; and a pair of engaging pieces that are retractably provided at positions facing each other with the operation portion interposed therebetween, on a third surface and a fourth surface connected to both the first surface and the second surface.

A second aspect of the embodiment provides an image display device including: a display that accommodates an image display device displaying an image; a main body that is integrally formed with the display; an accommodation portion that is formed to be recessed on a surface of the main body opposite to an image display side of the display, and accommodates an apparatus including a housing; an opening portion that is formed in the main body, and communicates between a space of the accommodation portion and a space on the image display side; a second electrical connection portion that is disposed on a bottom wall of the accommodation portion to input a signal of an image displayed by the image display device; and a pair of engaging plates that are provided at positions of edge portions of the accommodation portion in the main body between which the opening portion is interposed.

A third aspect of the embodiment provides a centralized operation apparatus that is obtained by integrating the above-described operation input device and the above-described image display device, and is capable of remotely operating the imaging device and displaying an image captured by the imaging device, wherein the operation input device is accommodated in the accommodation portion of the main body of the image display device, the operation portion of the operation input device protrudes to the space on the image display side through the opening portion of the image display device, the first electrical connection portion is connected to the second electrical connection portion, and the pair of engaging pieces engage with the pair of engaging plates such that the operation input device and the image display device are integrated.

A fourth aspect of the embodiment provides an imaging system including: an imaging device; an operation input device including an operation portion for remotely operating the imaging device, and a first electrical connection portion for outputting an image signal of an image captured by the imaging device; and an image display device including an image display device configured to receive an image signal output from the imaging device through the first electrical connection portion, and to display an image based on the image signal.

The image display device includes: a display that accommodates the image display device; a main body that is integrally formed with the display; an accommodation portion that is formed to be recessed on a surface of the main body opposite to an image display side of the display and accommodates at least a part of the operation input device; an opening portion that is formed in the main body and communicates between a space of the accommodation portion and a space on the image display side; and a second electrical connection portion that is disposed on a bottom wall of the accommodation portion to input the image signal.

At least a part of the operation input device is accommodated in the accommodation portion. The operation portion protrudes to the space on the image display side through the opening portion. The first electrical connection portion is connected to the second electrical connection portion. The operation input device and the image display device configure a centralized operation apparatus that is capable of remotely operating the imaging device and displaying an image captured by the imaging device.

BRIEF DESCRIPTION OF THE DRAWINGS

FIGS. 1A and 1B are diagrams illustrating the first mode of an imaging system SY which is an example of an imaging system according to at least one embodiment.

FIGS. 2A and 2B are diagrams illustrating the second mode of the imaging system SY.

FIGS. 3A and 3B are diagrams illustrating the third mode of the imaging system SY.

FIGS. 5A to 5D are diagrams illustrating an operation input device 11 which is an example of an operation input device according to the embodiment.

FIGS. 6A to 6C are diagrams illustrating an image display device 31 which is an example of an image display device according to the embodiment.

FIGS. 10A to 10C are diagrams illustrating an image display device 91 which is another example of the image display device according to the embodiment.

DETAILED DESCRIPTION

Figure 4A:
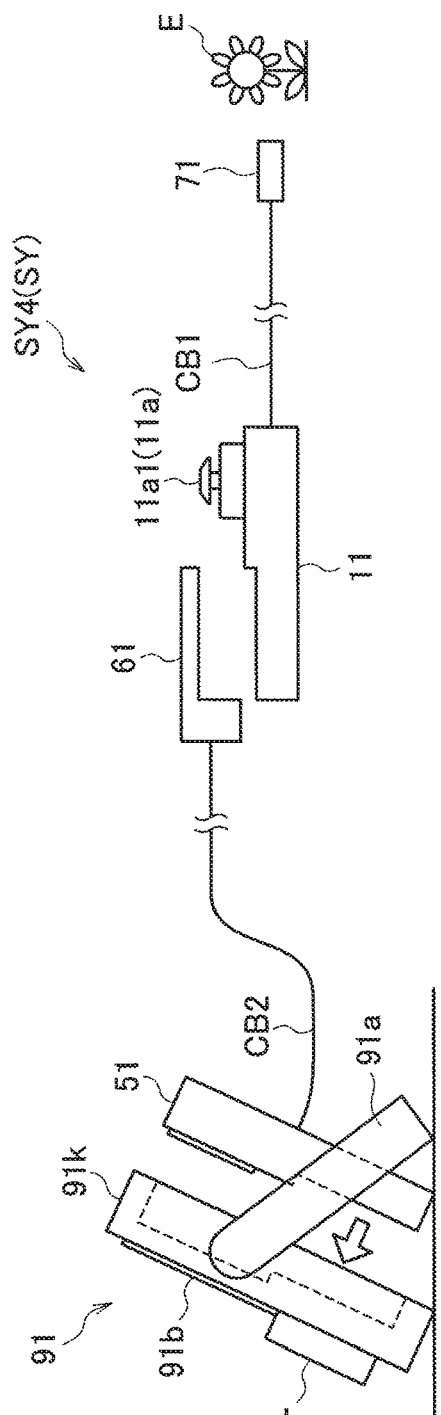
FIGS. 4A and 4B are diagrams illustrating the fourth mode of the imaging system SY.

An imaging system SY which is an example of an imaging system according to the embodiment will be described with reference to FIGS. 1A, 1B, 2A, 2B, 3A, 3B, 4A, and 4B. The imaging system SY is an example of a configuration in which a camera device described below is remotely operated by wire. The imaging system SY is classified into the imaging systems SY1 to SY4 of four different modes based on a member to be combined and a combining method. First, a schematic configuration of each of the imaging systems SY1 to SY4 will be described.
<Imaging System SY1>

As illustrated in FIGS. 1A and 1B, the imaging system SY1 includes: a camera device 71 as an imaging device that images an object E; an operation input device 11 that is connected to the camera device 71 through a camera cable CB1 and remotely operates the camera device 71; and an image display device 31 that displays an image captured by the camera device 71.

The camera device 71 includes: an optical system that includes an objective lens; and an image sensor that converts an optical signal from an image of the object E formed by the optical system into an electrical signal (all the elements are not illustrated). In addition, the camera device 71 may include a light projecting portion that projects light toward the object E using a light emitting element such as an LED for imaging in a dark place.

The image signal output from the image sensor is supplied to the operation input device 11 through the camera cable CB1. Optical adjustment of a focal point, a zoom level, an f number or the like of the camera device 71 is performed using the operation input device 11 by remote operation.

In a case where the camera device 71 includes an actuator (not illustrated) that makes an optical axis movable, the operation input device 11 may be configured to remotely control the motion of the actuator by electrical means. In a case where the camera device 71 is configured such that an optical axis is mechanically movable by wire or the like, the operation input device 11 may be configured such that the movement of the optical axis can be remotely operated by mechanically pulling or pushing an optical axis moving member of the camera device 71 on another end side of the wire passing through the camera cable CB1. In a case where the camera device 71 is mounted on a moving object such as a robot, the operation input device 11 may be configured to remotely operate an actuator of the moving object by electrical means.

In order to remotely operate the camera device 71 or the moving object, an operation portion 11a is provided in the operation input device 11. The kind of the operation portion 11a is not particularly limited. As illustrated in FIGS. 5A to 5D, the operation portion 11a includes a joystick 11a1, and a push button group 11a3, for example. The push button group 11a3 may be a so-called cross key in which arrow keys are disposed at an interval of 90° in the circumferential direction.

As illustrated in FIGS. 6A to 6C, the image display device 31 is a so-called handy monitor on which an image can be observed with a screen size of about 3 to 5 inches, and which can be handheld. The image display device 31 includes: a display 31a that accommodates a plate-shaped image display device having a size of about 3 to 5 inches such as a liquid crystal device and can display an image; and a main body 31b as a housing that is integrally formed with the display 31a.

As illustrated in FIG. 1A or 6C, the main body 31b includes an accommodation portion 31b1 that accommodates the operation input device 11 such that the operation input device 11 is detachable from a rear surface side of the image display device 31. The rear surface is a surface opposite to a display surface (front surface) of the display 31a.

In a case where the operation input device 11 is accommodated in the accommodation portion 31b1 as illustrated in FIG. 1B, an electrical connection portion 31c2 of the image display device 31 illustrated in FIG. 6C, and an electrical connection portion 11b of the operation input device 11 illustrated in FIG. 5A are electrically and mechanically connected. As a result, a handy centralized operation apparatus 81 illustrated in FIG. 11 into which the image display device 31 and the operation input device 11 are integrated is configured.

At this time, the joystick 11a1, which is the operation portion 11a of the operation input device 11, penetrates the main body 31b to protrude from and be exposed to a front side where an image is observed such that the same operation as that in a case where the operation input device 11 is provided alone can be performed.

A battery BT is detachably mounted on the main body 31b. The battery BT supplies power to the handy centralized operation apparatus 81. In addition, the battery BT also supplies power to the camera device 71 through the camera cable CB1.

At a position distant from the camera device 71, the operator can observe an image of the object E captured by the camera device 71 using the image display device 31 of the handy centralized operation apparatus 81. The handy centralized operation apparatus 81 can remotely operate at least the camera device 71. While holding the handy centralized operation apparatus 81 with hands, the operator can remotely operate the camera device 71, can operate the image display device 31, and can observe an image using the display 31a.

<Imaging System SY2>

As illustrated in FIGS. 2A and 2B, the imaging system SY2 includes: the camera device 71 that images the object E; and the operation input device 11 that is connected to the camera device 71 through the camera cable CB1 and remotely operates the camera device 71. The imaging system SY2 further includes: a relay attachment 61 that is detachable from the operation input device 11; an adapter 51 that is connected to one end side of a relay cable CB2 of which another end side is connected to the relay attachment 61; and a handy image display device 31.

The imaging system SY2 is different from the imaging system SY1, in that the operation input device 11 and the image display device 31 are not integrated and are connected through the relay cable CB2, and the relay attachment 61 and the adapter 51 that are attached to both ends of the relay cable CB2.

As illustrated in FIG. 2A, the relay attachment 61 is attached to the operation input device 11. In addition, the adapter 51 is accommodated in the accommodation portion 31b1 of the image display device 31. As a result, as illustrated in FIG. 2B, an input operation unit 83 into which the relay attachment 61 and the operation input device 11 are integrated is configured. In addition, a handy image display unit 82 into which the adapter 51 and the image display device 31 are integrated is configured.

The battery BT mounted on the image display device 31 supplies power to the handy image display unit 82. In addition, the battery BT supplies power to the input operation unit 83 through the relay cable CB2. Furthermore, the battery BT supplies power to the camera device 71 through the relay cable CB2, the input operation unit 83, and the camera cable CB1.

The camera device 71 can be remotely operated by the input operation unit 83. An image captured by the camera device 71 can be observed using the handy image display unit 82 at a position distant from the input operation unit 83.

<Imaging System SY3>

As illustrated in FIGS. 3A and 3B, the imaging system SY3 includes: the camera device 71 that images the object E; the operation input device 11 that is connected to the camera device 71 through the camera cable CB1 and remotely operates the camera device 71; and an image display device 91 that displays an image captured by the camera device 71.

The image display device 91 has a screen size of about 6 to 15 inches, for example, and functions as a so-called stationary monitor that is used in a state where it is disposed on a table, for example.

The imaging system SY3 is different from the imaging system SY1, in that the stationary image display device 91 is used instead of the handy image display device 31.

As illustrated in FIGS. 10A and 10C, the image display device 91 includes: a display 91b that can display an image using a plate-shaped image display device 91b1 having a size of about 6 to 15 inches such as a liquid crystal device; a housing 91k that supports the display 91b; and a handle 91a that is provided such that the housing 91k can be carried and the image display device 91 can be disposed on a table or the like in a state where it is inclined.

As illustrated in FIG. 3A or 10C, the housing 91k includes an accommodation portion 91d that accommodates the operation input device 11 such that the operation input device 11 is detachable from a rear surface side of the image display device 91. The rear surface is a surface opposite to a display surface of the display 91b.

In a case where the operation input device 11 is accommodated in the accommodation portion 91d as illustrated in FIG. 3B, an electrical connection portion 91d3 of the image display device 91 illustrated in FIG. 10C, and the electrical connection portion 11b of the operation input device 11 illustrated in FIG. 5A are electrically and mechanically connected. As a result, a stationary centralized operation apparatus 84 illustrated in FIG. 13 into which the image display device 91 and the operation input device 11 are integrated is configured.

At this time, the joystick 11a1, which is the operation portion 11a of the operation input device 11, penetrates the housing 91k to protrude from and be exposed to the front side where an image is observed such that the same operation as that in a case where the operation input device 11 is provided alone can be performed.

As illustrated in FIG. 10A or 10C, a socket portion 91d4 having a battery socket 91d5 is provided in the housing 91k. The battery BT is detachably mounted on the battery socket 91d5. The battery BT supplies power to the stationary centralized operation apparatus 84, and supplies power to the camera device 71 through the camera cable CB1.

With the stationary centralized operation apparatus 84, at a position distant from the camera device 71, the operator can observe an image captured by the camera device using the image display device 91 of the stationary centralized operation apparatus 84. The stationary centralized operation apparatus 84 can remotely operate at least the camera device 71 through the operation input device 11. The operator can remotely operate the camera device 71, can operate the image display device 91, and can observe an image using the display 91b in a state where the stationary centralized operation apparatus 84 is placed on a table, for example.

<Imaging System SY4>

Figure 4B:
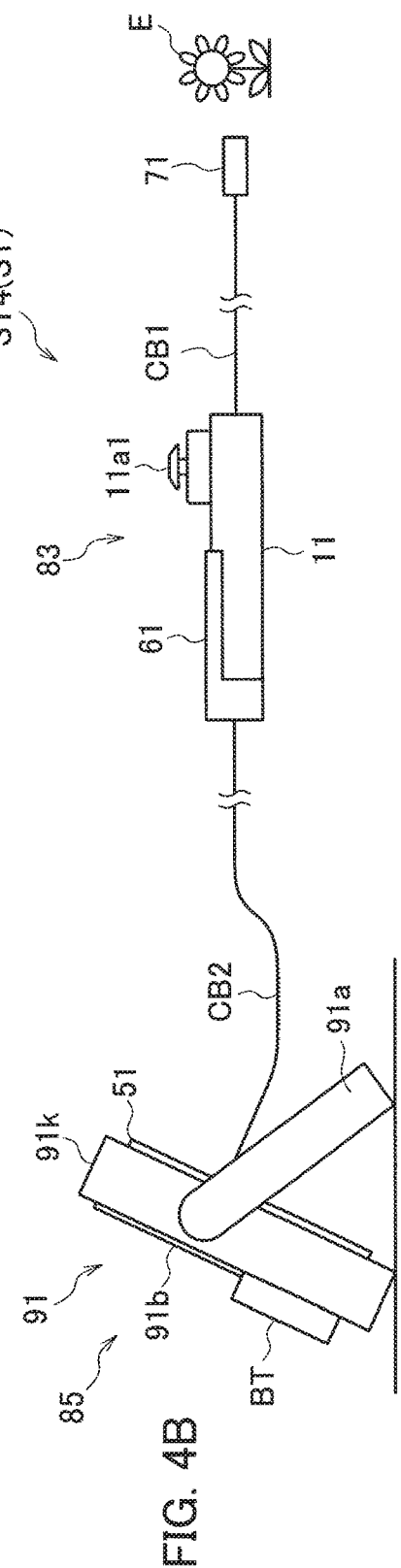

The imaging system SY4 illustrated in FIGS. 4A and 4B includes: the camera device 71 that images the object E; and the operation input device 11 that is connected to the camera device 71 through the camera cable CB1 and remotely operates the camera device 71. The imaging system SY4 further includes: the relay attachment 61 that is detachable from the operation input device 11; the adapter 51 that is connected to one end side of the relay cable CB2 of which another end side is connected to the relay attachment 61; and the stationary image display device 91.

The imaging system SY4 is different from the imaging system SY3, in that the operation input device 11 and the image display device 91 are not integrated and are connected through the relay cable CB2, and the relay attachment 61 and the adapter 51 that are attached to both ends of the relay cable CB2.

As illustrated in FIG. 4A, the relay attachment 61 is attached to the operation input device 11. In addition, the adapter 51 is accommodated in the accommodation portion 91d of the image display device 91. As a result, as illustrated in FIG. 4B, an input operation unit 83 into which the relay attachment 61 and the operation input device 11 are integrated is configured. In addition, a stationary image display unit 85 into which the adapter 51 and the image display device 91 are integrated is configured.

The battery BT of the image display device 91 supplies power to the stationary image display unit 85, and supplies power to the input operation unit 83 through the relay cable CB2. In addition, the battery BT supplies power to the camera device 71 through the relay cable CB2, the input operation unit 83, and the camera cable CB1.

The camera device 71 can be remotely operated by the input operation unit 83. In addition, an image captured by the camera device 71 can be observed using the stationary image display unit 85 at a position distant from the input operation unit 83.

Next, each member constituting the imaging systems SY1 to SY4 will be described in detail.

(Operation Input Device 11)

FIGS. 5A to 5D illustrate the operation input device 11. FIG. 5A is the front view, FIG. 5B is the right side view, FIG. 5C is the rear view, and FIG. 5D is the bottom view. In FIGS. 5A to 5D, the left, right, front, rear, up, and down directions are indicated by arrows.

The operation input device 11 includes a housing 11k that is formed in a long, substantially prismatic shape in the up-down direction. The housing 11k is formed by the molding of a resin having high impact resistance or die casting of metal. In this example, the housing 11k is formed such that a cross-sectional shape thereof perpendicular to the up-down direction is rectangular.

The housing 11k includes a base portion 11ka on the lower side, and a wide portion 11kb that extends in the upper left and right directions. A front surface 11k2 of the housing 11k is formed stepwise such that the wide portion 11kb is positioned closer to the front side than the base portion 11ka. In the following description, the front surface of the base portion 11ka and the front surface of the wide portion 11kb will be referred to as a front surface 11k2.

The camera cable CB1, as a signal transmitting and receiving portion, extends out from an upper surface 11k1 of the housing 11k. The operation portion 11a is disposed on the front surface 11k2 of the wide portion 11kb of the housing 11k. The front surface 11k2 is a surface connected to the upper surface 11k1 where the camera cable CB1 is provided. In this example, the operation portion 11a includes: the joystick 11a1 that includes an operation lever 11a2 protruding to the front; and the push button group 11a3 that is provided below the joystick 11a1. In this example, the push button group 11a3 includes two buttons that are disposed distant from each other in the left-right direction.

Gaps between the joystick 11a1, the push button group 11a3, and the housing 11k are sealed such that infiltration of water or dust to the inside is prevented.

The electrical connection portion 11b as a connector is attached to the front surface 11k2 of the base portion 11ka of the housing 11k. The electrical connection portion 11b has plural electrical contacts P2. A seal ring 11c that surrounds the electrical connection portion 11b and is formed of rubber or the like for being waterproof is fitted into the front surface 11k2 such that a part thereof protrudes from the surface.

A female screw portion 11d for attachment of the relay attachment 61 is provided below the electrical connection portion 11b on the front surface 11k2 of the base portion 11ka. Two guide ribs 11e that extend in the front-rear direction to be distant from each other in the up-down direction are formed to protrude from a left side surface 11k3 and a right side surface 11k4 of the housing 11k, respectively.

Engaging pieces 11f that advance and retract in the left-right direction are retractably provided at rear portions of the left side surface 11k3 and the right side surface 11k4 of the wide portion 11kb, respectively. Both the left side surface 11k3 and the right side surface 11k4 are surfaces connected to the front surface 11k2 and the upper surface 11k1.

The positions in the up-down direction where the engaging pieces 11f are provided correspond to the operation lever 11a2 of the joystick 11a1. The engaging pieces 11f are biased to the outside and protrude under natural conditions by a compression spring (not illustrated) that is provided in the housing 11k. Ridges of tip end surfaces of the engaging pieces 11f in the front-rear direction are C-chamfered.

As illustrated in FIG. 5C, on a rear surface 11k5 of the wide portion 11kb of the housing 11k, a pair of finger plates 11g that are movable in a direction indicated by arrows DRa are provided at positions corresponding to the engaging pieces 11f to be distant from each other in the left-right direction. The finger plates 11g are connected to the engaging pieces 11f. By moving the finger plates 11g to the inside of the housing 11k (in the direction indicated by the arrows DRa) against the biasing force of the compression spring, the engaging pieces 11f can be stored in the housing 11k.

As illustrated in FIG. 5A or 5D, a lock piece 11h that protrudes under normal conditions due to the compression spring (not illustrated) is retractably provided in a front portion of a lower surface 11k6 of the housing 11k. A pair of ridges of a tip end of the lock piece 11h that extend in the left-right direction are C-chamfered such that the lock piece 11h is smoothly guided to a recessed state during engagement and disengagement with a counterpart component.

The operator holds the base portion 11ka of the housing 11k with hands and operates the operation portion 11a using fingers to remotely operate the camera device 71. In the housing 11k, the camera cable CB1, the operation portion 11a, and the electrical connection portion 11b are disposed in this order from the upper side. Therefore, regarding the operation posture, in a case where the camera cable CB1 extends out from the upper surface 11k1 as in the example, the camera cable CB1 does not interfere with the operation using the operation portion 11a as compared to a case where the camera cable CB1 extends out from another surface. In addition, the camera device 71 is visually positioned ahead in the extending direction, and thus it is easy to operate the camera device 71. Therefore, the above-described configuration is preferable.

Figure 15:
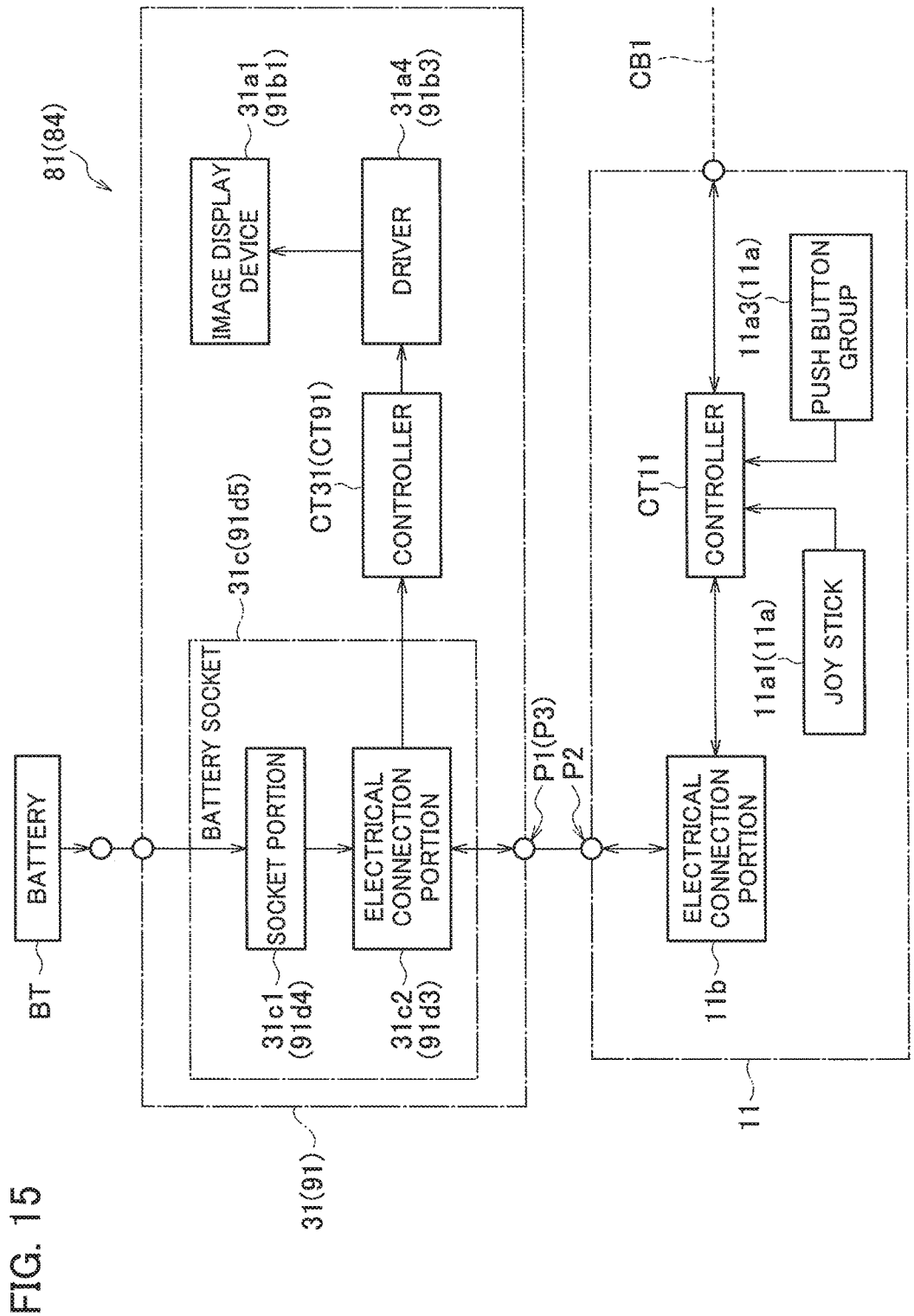
FIG. 15 is a block diagram illustrating an electrical configuration of the handy centralized operation apparatus 81.

A block diagram of the electrical configuration of the operation input device 11 is included in a block diagram of the handy centralized operation apparatus 81 and shown in FIG. 15.

As illustrated in FIG. 15, the operation input device includes a controller CT11 and can operate by power being supplied to the electrical connection portion 11b from the outside (for example, the battery BT). When the operator operates the operation portion 11a, an operation signal is input to the controller CT11, and the operation information based on the operation is output from the controller CT11 to the outside through the electrical connection portion 11b and the camera cable CB1.

The controller CT11 may be configured to perform determination according to a preset program or the like. In this case, the controller CT11 appropriately selects signals (for example, an image signal or a feedback signal from an actuator) received from the outside through the camera cable CB1, processes the selected signals, and outputs the processed signals through the electrical connection portion 11b.

(Image Display Device 31)

FIGS. 6A to 6C illustrate the image display device 31. FIG. 6A is the front view, FIG. 6B is the right side view, and FIG. 6C is the rear view. In FIGS. 6A to 6C, the left, right, front, rear, up, and down directions are indicated by arrows.

The image display device 31 includes: the main body 31b as a housing that is formed in a long substantially rectangular parallelepiped shape in the up-down direction; and the display 31a that is connected to an upper portion of the main body 31b, extends to be inclined obliquely forward with respect to the main body 31b, and has a larger width in the left-right direction than the main body 31b.

The display 31a can accommodate a thin plate-shaped image display device 31a1 (refer to FIG. 7) formed of, for example, liquid crystal or the like, and a driver 31a4 thereof. On a display surface of the display 31a, a window portion 31a2 is exposed except for a frame portion that is formed. The window portion 31a2 has a screen size of 4.5 inches, for example. The main body 31b is formed by the molding of a resin having a high impact resistance or a die casting of metal.

As illustrated in FIG. 6C, in the main body 31b, the accommodation portion 31b1 as the recessed portion that accommodates at least the front portion sides of the operation input device 11 and the adapter 51 (the details will be described below) such that the front portion sides are detachable from a rear side of the main body 31b is formed. The accommodation portion 31b1 includes, as inner wall surfaces 31e, five surfaces including an upper surface 31e1, a lower surface 31e2, a left surface 31e3, a right surface 31e4, and a front surface 31e5 except for the rear side.

Figure 7:
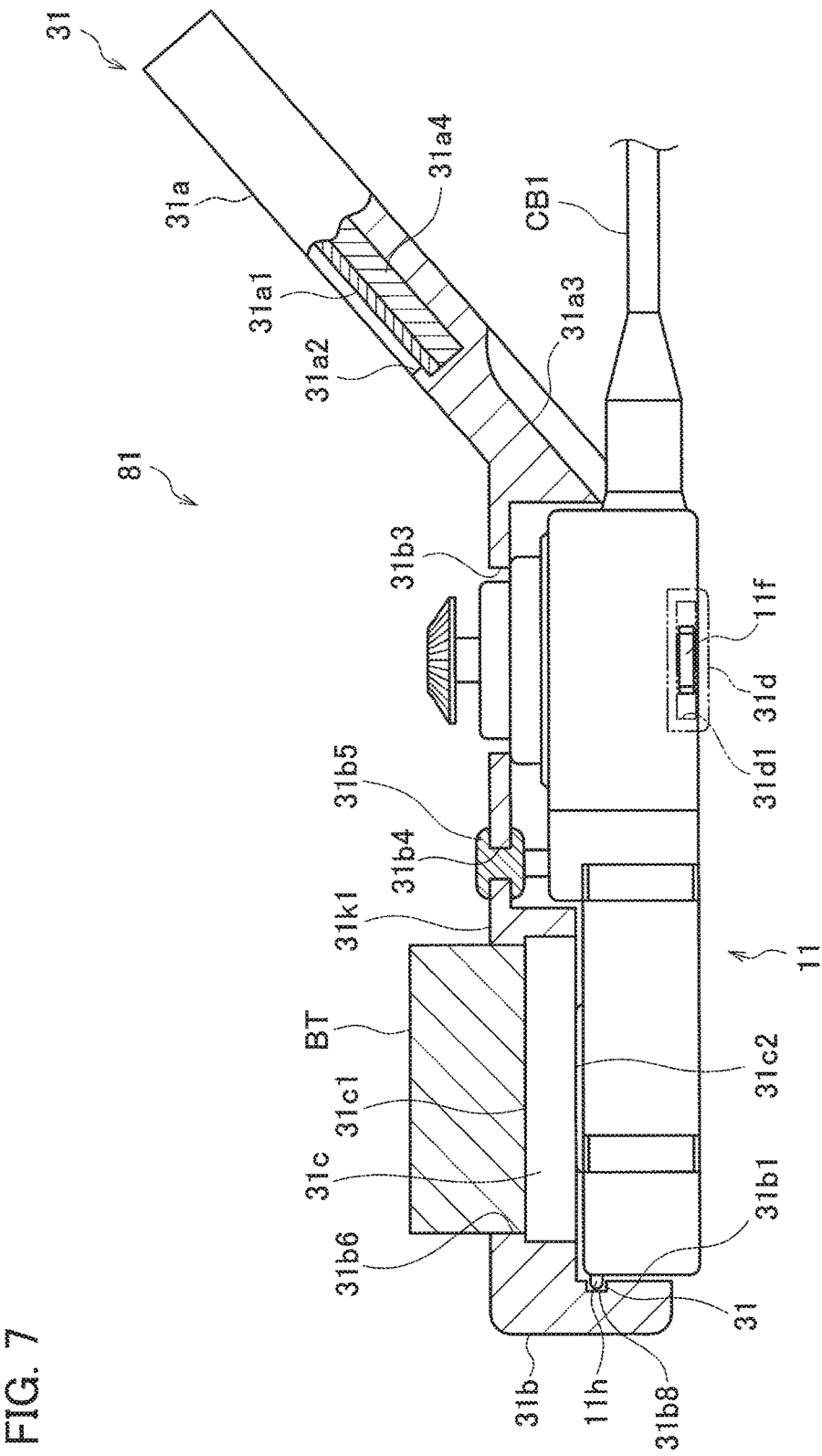
FIG. 7 is a cross-sectional view illustrating a handy centralized operation apparatus 81 which is an example of a centralized operation apparatus according to the embodiment.
Figure 11:
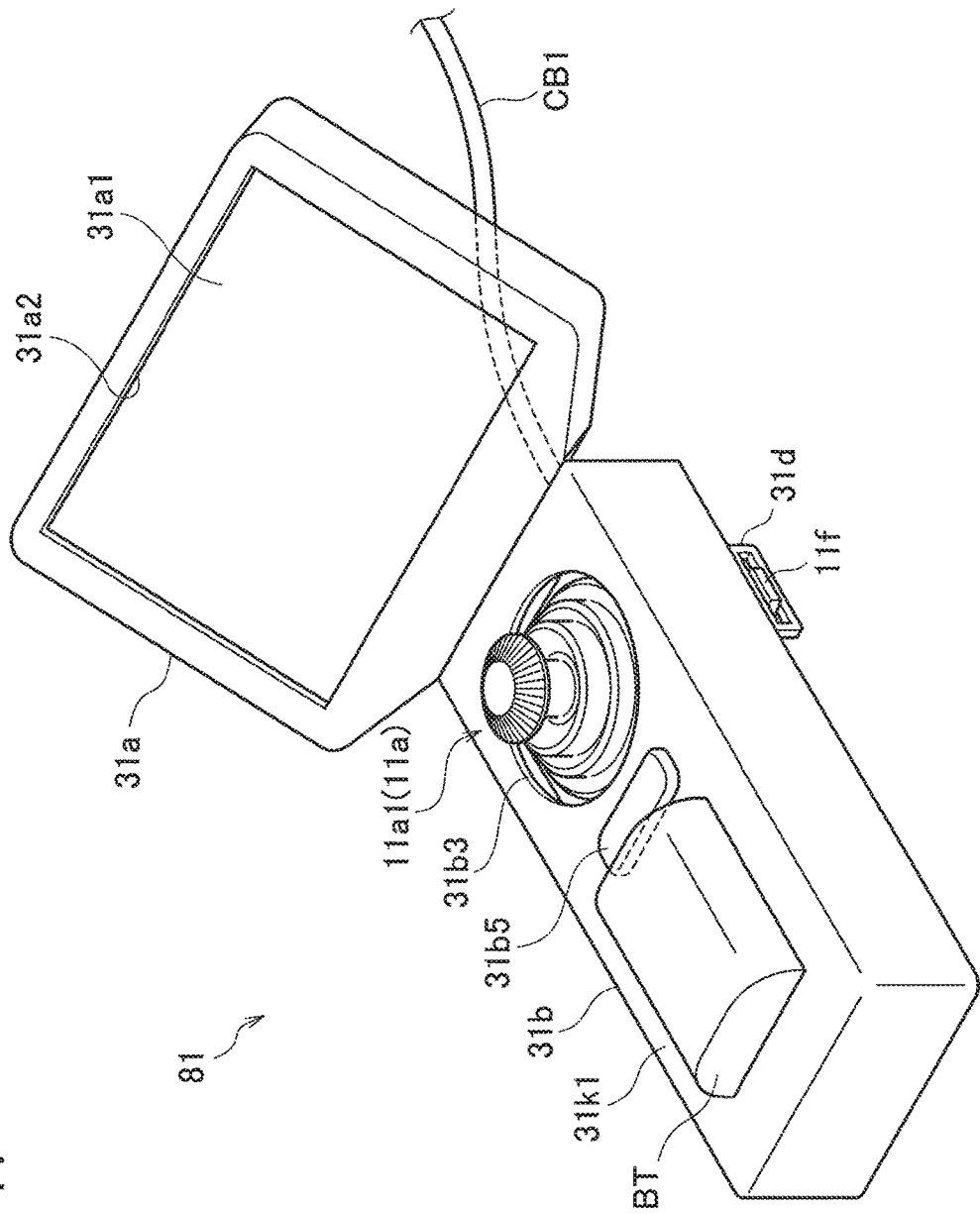
FIG. 11 is a perspective view illustrating an external appearance of the handy centralized operation apparatus 81.

FIG. 7 is a cross-sectional view taken along line S7-S7 illustrating a state where the handy centralized operation apparatus 81 is configured by accommodating the operation input device 11 in the accommodation portion 31b1. In addition, FIG. 11 is a perspective view illustrating the external appearance of the handy centralized operation apparatus 81.

In a front surface 31k1 of the main body 31b, an opening portion 31b3 is formed at a position corresponding to the joystick 11a1 of the accommodated operation input device 11. The opening portion 31b3 communicates between a space of the accommodation portion 31b1 and a space on the image display side as the front surface side. In addition, an opening portion 31b4 is formed at a position corresponding to the push button group 11a3 of the operation input device 11. A flexible push sheet 31b5 formed of rubber or the like is fitted into the opening portion 31b4.

As illustrated in FIG. 6C or FIG. 7, the battery socket 31c is attached to the lower portion of the main body 31b. The socket portion 31c1, which is provided on the upper surface of the battery socket 31c and on which the battery BT is detachably mounted, is exposed to the outside through a long hole 31b6 that is formed in the main body 31b in a vertically long, rectangular shape in a state where the battery BT is removed.

On the lower surface of the battery socket 31c, that is, on the bottom wall surface of the accommodation portion 31b1, the electrical connection portion 31c2 as a connector that is connected to the electrical connection portion 11b of the operation input device 11 is provided. The electrical connection portion 31c2 includes plural electrical contacts P1 corresponding to the plural electrical contacts P2 in the electrical connection portion 11b of the operation input device 11.

In the rear end portion of the main body 31b, engaging plates 31d that protrude to the rear are attached to regions near a left side surface 31k2 and a right side surface 31k3, respectively. In other words, a pair of engaging plates 31d are provided to protrude to the rear at positions of edge portions of the accommodation portion 31b1, between which the opening portion 31b3 is interposed. The engaging plates 31d are formed of a metal plate material, for example.

Long holes 31d1 that extend in the front-rear direction are formed in the engaging plates 31d, respectively. When the operation input device 11 is accommodated in the accommodation portion 31b1, the engaging pieces 11f engage with the long holes 31d1.

In the front portion of a lower wall surface 31k of the accommodation portion 31b1, a recessed portion 31b8 that extends in the left-right direction is formed. The lock piece 11h of the operation input device 11 accommodated in the accommodation portion 31b1 engages with the recessed portion 31b8 so as to be fitted thereto or released therefrom. Recessed portions 31b7 that extend in the front-rear direction are formed on the left and right side surfaces of the accommodation portion 31b1 such that, when the operation input device 11 is accommodated in the accommodation portion 31b1, the guide ribs 11e engage with the recessed portions 31b7 and guide to be accommodated therein.

A notch portion 31a3 is formed in a portion of the display 31a on the main body 31b side in order to prevent the operation input device 11 accommodated in the accommodation portion 31b1 from interfering with the camera cable CB1.

A block diagram illustrating the electrical configuration of the image display device 31 is included in the block diagram of the handy centralized operation apparatus 81, and is shown in FIG. 15.

The image display device 31 used the battery BT mounted on the socket portion 31c1 of the battery socket 31c as a power source and can display an image on the image display device 31a1 based on the image signal received from the electrical connection portion 31c2.

As described above, the operation input device 11 is detachably mounted on the accommodation portion 31b1. Specifically, after engaging the guide ribs 11e with the recessed portions 31b7, the operation input device 11 can move forward from a rear side of the image display device 31 without any change. At this time, the lock piece 11h of the operation input device 11 is pressed against the lower surface 31e2 of the accommodation portion 31b1 to enter into a recessed state and thus does not interfere with the insertion of the operation input device 11.

When the operation input device 11 is pressed and inserted by a predetermined distance, the engaging pieces 11f abut on the engaging plates 31d. The ridges of the tipend surfaces of the engaging pieces 11f in the front-rear direction are C-chamfered. Therefore, the engaging pieces 11f are guided by the C-chamfered ridges to move in a direction in which they are recessed, into the housing 11k against the biasing force of the compression spring, and the insertion of the operation input device 11 is allowed. When the operation input device 11 is further pressed, the engaging pieces 11f reach the long holes 31d1 of the engaging plates 31d, and engage with the long holes 31d1 due to the biasing force of the compression spring so as to be positioned and locked.

That is, by pressing operation input device 11 forward during the mounting of the operation input device 11, the mounting is automatically completed, and the operation input device 11 is locked. In this mounted state, the seal ring 11c is crushed by a predetermined amount such that the electrical connection portions are sealed.

When the operation input device 11 is removed, the operator moves the pair of finger plates 11g close to each other using fingers. As a result, the engaging pieces 11f are recessed into the housing 11k, the engagement between the engaging pieces 11f and the engaging plates 31d is released, and the operation input device 11 can be removed from the image display device 31. When the engagement between the engaging pieces 11f and the engaging plates 31d is released, the operation input device 11 naturally moves to the rear side due to a compression repulsive force of the seal ring 11c. As a result, the operation input device 11 can be more easily removed.

In a state where the operation input device 11 is mounted on the image display device 31, the five inner wall surfaces 31e of the accommodation portion 31b1 face five outer wall surfaces of the housing 11k of the operation input device 11 excluding the rear surface 11k5. The upper surface 31e1, the lower surface 31e2, the left surface 31e3, and the right surface 31e4 of the accommodation portion 31b1 are in contact with or face the upper surface 11k1, the lower surface 11k6, the left side surface 11k3, and the right side surface 11k4 of the operation input device 11 with very small clearances, respectively.

Due to the engagement between the engaging piece 11f and the engaging plates 31d, the front surface 11k2 of the housing 11k presses the front surface 31e5 of the accommodation portion 31b1 while crushing the seal ring 11c.

As a result, the operation input device 11 accommodated in and mounted on the accommodation portion 31b1 is strongly integrated with the image display device 31 to configure the handy centralized operation apparatus 81 substantially without moving in all of the front, rear, left, right, up, and down directions.

In the mounted state, the electrical connection portion 11b on the operation input device 11 side is electrically connected to the electrical connection portion 31c2 on the image display device 31 side through the electrical contacts P2 and P1. In addition, in the mounted state, the seal ring 11c is crushed between the front surface 11k2 of the housing 11k, and the front surface 31e5 of the accommodation portion 31b1.

As a result, the electrical connection portions are insulated from the outside by the seal ring 11c, and are positioned in a sealed space such that infiltration of water, water drops, dust, and the like into the electrical connection portions from the outside is prevented.

In addition, in the mounted state, the joystick 11a1 of the operation input device 11 protrudes and is exposed from the image display side as the front side through the opening portion 31b3 of the main body 31b such that the operator can directly operate the joystick 11a1 from the front side. The push button group 11a3 is positioned corresponding to the push sheet 31b5 and can be operated from the front side by pushing the push sheet 31b5 using a finger.

As illustrated in FIG. 15, in the handy centralized operation apparatus 81, the power of the battery BT is supplied to the operation input device 11 side due to the connection between the electrical connection portion 11b of the operation input device 11 and the electrical connection portion 31c2 of the image display device 31 (the connection between the contacts P2 and the contacts P1). In addition, on the operation input device 11 side, an image signal received from the camera device 71 through the camera cable CB1 is transmitted to the controller CT31, and an image based on the image signal is displayed by the image display device 31a1 through the driver 31a4.

As a result, with the handy centralized operation apparatus 81 that is configured by mounting the operation input device 11 on the image display device 31, the operator can observe an image captured by the camera device 71 while remotely operating the camera device 71.

(Relay Attachment 61)

Figures 8A, 8B, 8C:
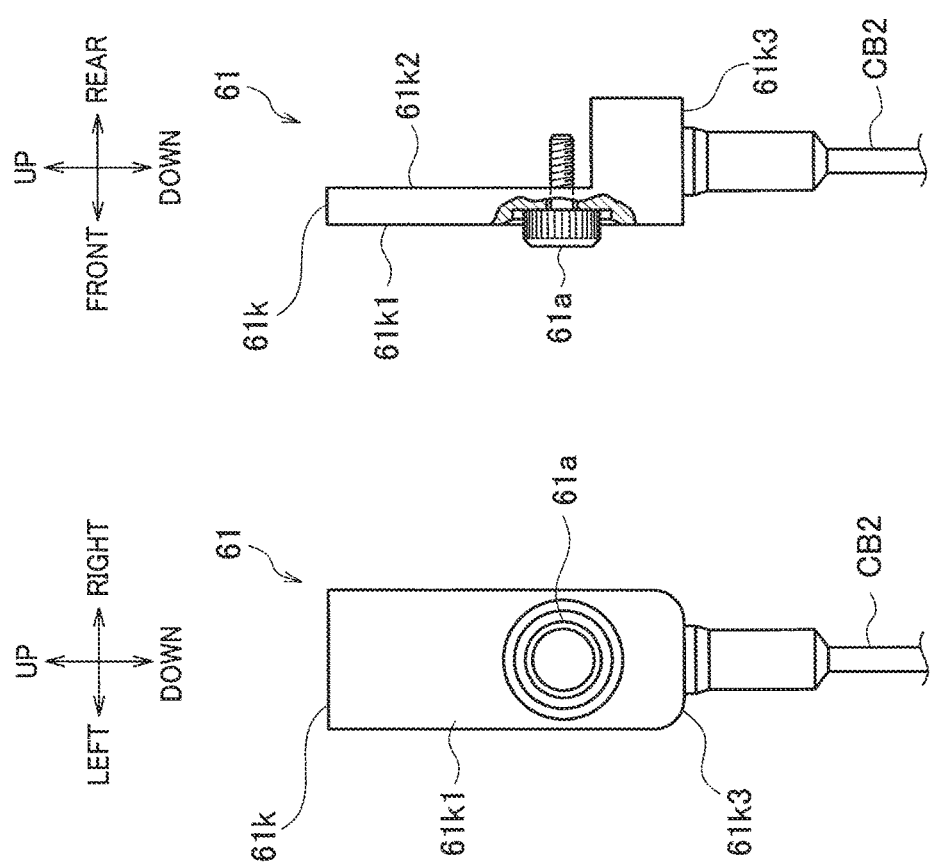
FIGS. 8A to 8C are diagrams illustrating a relay attachment 61 that can be connected to the operation input device 11.

FIGS. 8A to 8C illustrate the relay attachment 61. FIG. 8A is the front view, FIG. 8B is the right side view (partially cross-sectional view), and FIG. 8C is the rear view. In FIGS. 8A to 8C, the left, right, front, rear, up, and down directions are indicated by arrows corresponding to the operation input device 11.

The relay attachment 61 can be mounted on the operation input device 11 (refer to FIGS. 2A and 2B). The relay attachment 61 includes a housing 61k having an L-shape in the side view. A male screw knob 61a having a male screw portion at the tip end is attached to the housing 61k so as to be rotated by a finger from the front surface 61k1 side. When the relay attachment 61 is mounted on the operation input device 11, the male screw portion of the male screw knob 61a can be fastened to the female screw portion 11d of the operation input device 11 by screwing the male screw portion thereinto.

An electrical connection portion 61b as a connector that is connected to the electrical connection portion 11b of the operation input device 11 is attached to a rear surface 61k2 of the housing 61k. The relay cable CB2 extends out from a lower surface 61k3 of the housing 61k.

Figure 12:
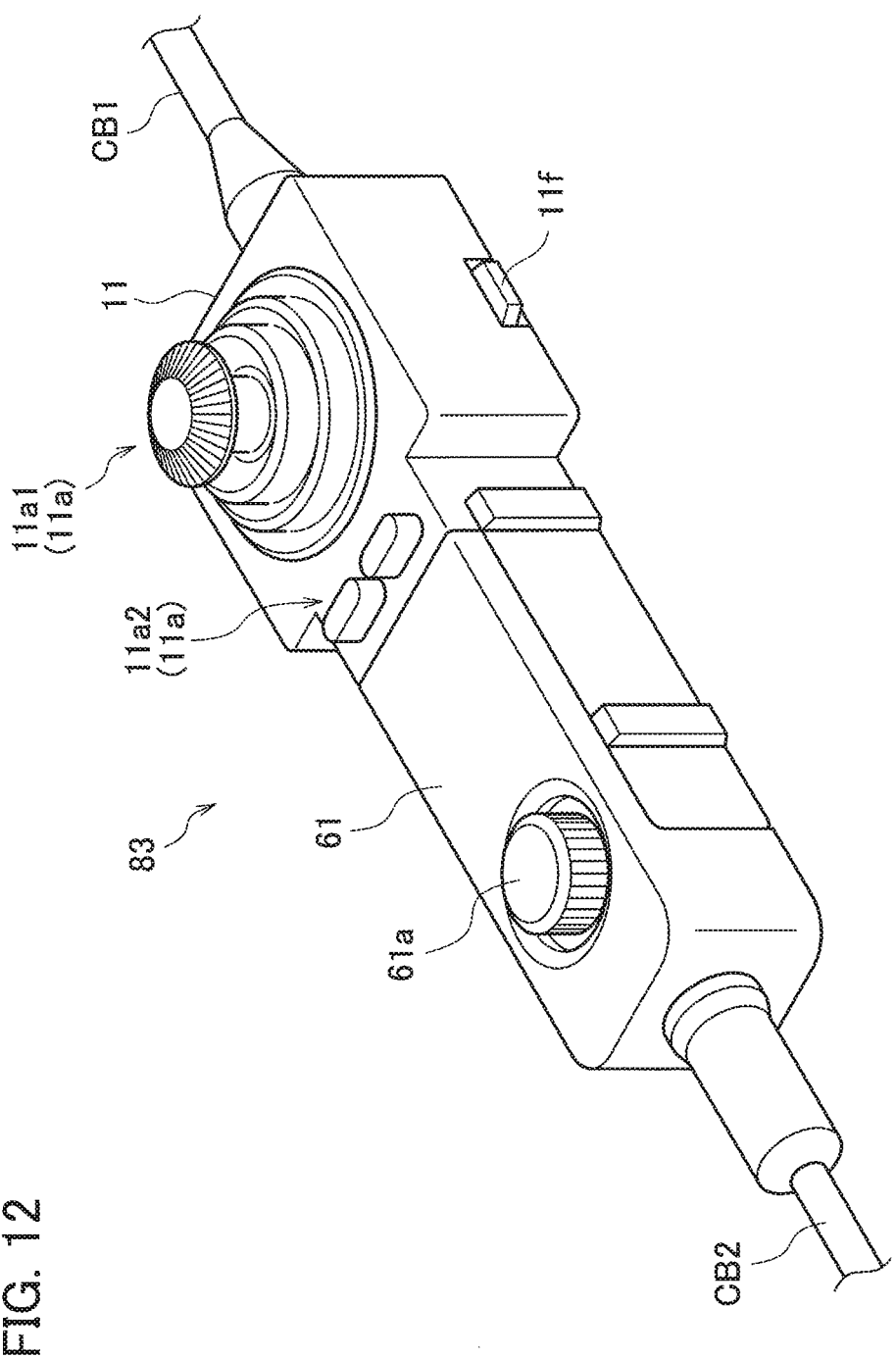
FIG. 12 is a perspective view illustrating an external appearance of an input operation unit 83 in which the relay attachment 61 is mounted on the operation input device 11.

By abutting the relay attachment 61 having an L-shape on the lower surface 11k6 and the front surface 11k2 of the operation input device 11, and screwing and fastening the male screw knob 61a to the female screw portion 11d, the input operation unit 83 in which the relay attachment 61 is mounted on the operation input device 11 is configured. FIG. 12 is a perspective view illustrating the external appearance of the input operation unit 83.

The relay attachment 61 has an external shape that can be handheld and has a function as a grip that can be handheld. A surface member of the relay attachment 61 is formed of a non-slip material or has a shape for suppressing slipping. As a result, the input operation unit 83 can be easily handheld, and operability is improved.

In the input operation unit 83, the electrical connection portion 61*b* is connected to the electrical connection portion 11*b* of the operation input device 11, and transmits power supplied from the battery BT through the relay cable CB2 to the operation input device 11. In addition, the image signal or the like is output from the operation input device 11 through the relay cable CB2.

(Adapter 51)

Figure 9A:
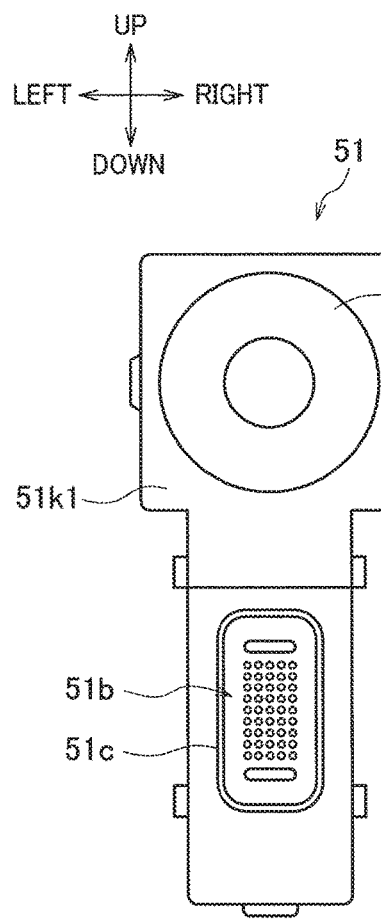
FIGS. 9A and 9B are diagrams illustrating an adapter 51 that can be connected to the image display device 31.
Figure 9B:
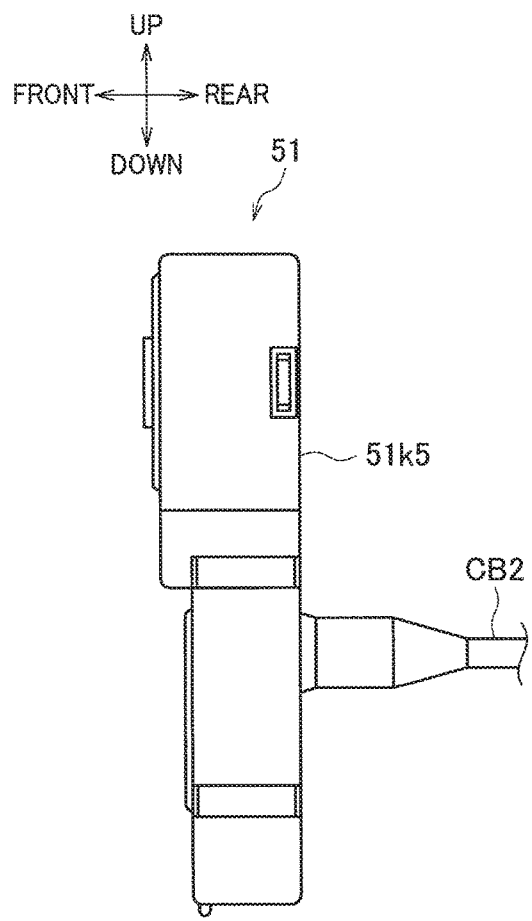

FIGS. 9A and 9B illustrate the adapter 51. FIG. 9A is the front view, and FIG. 9B is the right side view. In FIGS. 9A and 9B, the left, right, front, rear, up, and down directions are indicated by arrows. The adapter 51 is different from the operation input device 11, in that the operation portion 11*a* is not provided, and in that the relay cable CB2 extends out not from the upper surface of a housing 51*k* but from the rear surface 51*k*5 instead of the camera cable CB1.

Figure 16:
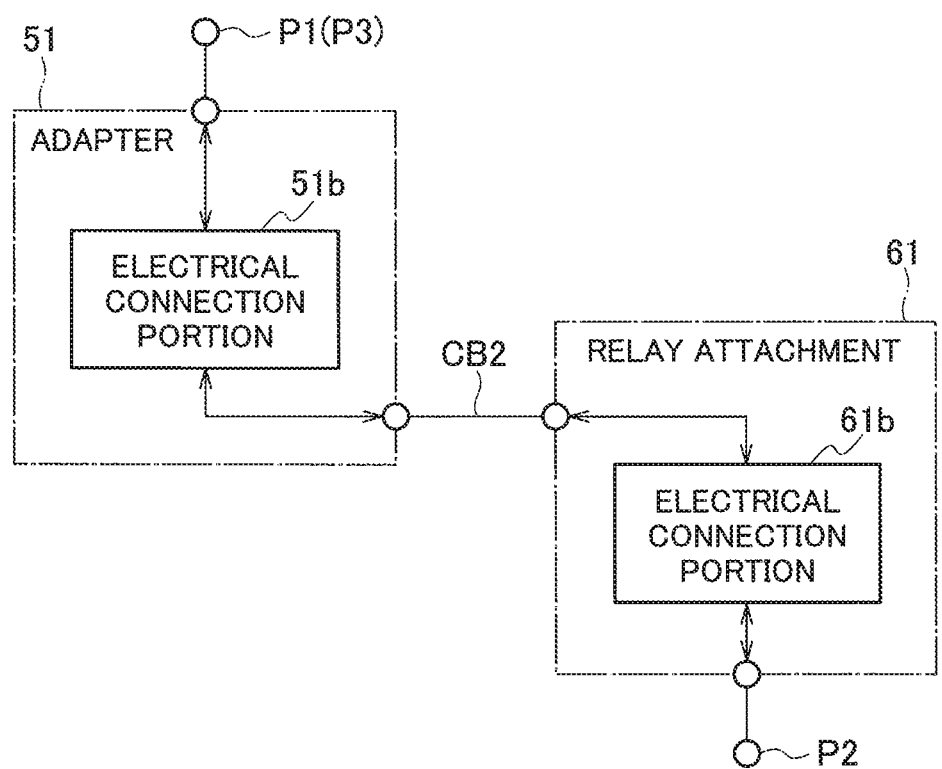
FIG. 16 is a block diagram illustrating an electrical configuration of the relay attachment 61 and the adapter 51.

FIG. 16 illustrates an electrical block diagram of the adapter 51 and the relay attachment 61 connected to each other through the relay cable CB2. The contacts P1 and P2 in FIG. 16 correspond to the contacts P1 (P3) and P2 in FIG. 15, respectively.

The adapter 51 includes the housing 51*k* having the same shape (same member) as the operation input device 11. A cover 51*a* that covers a hole of a portion from which the joystick 11*a*1 of the operation input device 11 is removed is attached to a front surface 51*k*1 of the housing 51*k*. In addition, the adapter 51 includes: an electrical connection portion 51*b* that is the same as the electrical connection portion 11*b* of the operation input device 11; and a seal ring 51*c* that covers the electrical connection portion 51*b*. The relay cable CB2 extends out from substantially the center portion of the rear surface 51*k*5 of the housing 51*k*.

The adapter 51 has the same structure as the operation input device 11 and can be accommodated in and mounted on the accommodation portion 31*b*1 of the image display device 31 or the accommodation portion 91*d* of the image display device 91. The image display device 31 and the adapter 51 configured to be mounted thereon configure the handy image display unit 82 illustrated in FIG. 2B. The image display device 91 and the adapter 51 configured to be mounted thereon configure the stationary image display unit 85 illustrated in FIG. 4B.

(Image Display Device 91)

The image display device 91 is a stationary type different from the handy image display device 31. FIGS. 10A to 10C illustrate the image display device 91. FIG. 10A is the front view, FIG. 10B is the right side view, and FIG. 10C is the rear view. In FIGS. 10A to 10C, the left, right, front, rear, up, and down directions are indicated by arrows.

The image display device 91 includes: the housing 91*k* that is open to the rear side and is formed in a short flat box shape in the front-rear direction; and the U-shaped handle 91*a* that is connected to the left and right side surfaces of the housing 91*k* so as to be rotatable around a rotation axis line CL1 extending in the left-right direction. The housing 91*k* supports the thin plate-shaped image display device 91*b*1 formed of liquid crystal, for example, and a screen 91*b*2 thereof can be observed from the front side through a front-surface-side window portion 91*c*. The window portion 91*c* has a screen size of 10 inches, for example.

In the housing 91*k*, the accommodation portion 91*d* that accommodates any one of the operation input device 11 and the adapter 51 such that any one of the operation input device 11 and the adapter 51 is detachable from the rear side of the main body 31*b* is formed as a recessed portion. The accommodation portion 91*d* is formed in the same shape as that of the accommodation portion 31*b*1 of the image display device 31, and the operation input device 11 and the adapter 51 are detachable from the same structure as that of the image display device 31.

That is, the accommodation portion 91*d* includes an opening portion 91*d*1, a push sheet 91*d*2, and the socket portion 91*d*4. Specifically, in a state where the operation input device 11 is accommodated in and mounted on the accommodation portion 91*d*, the joystick 11*a*1 protrudes and is exposed from the image display side as the front side through the opening portion 91*d*1.

The push sheet 91*d*2 is provided at a position corresponding to the push button group 11*a*3, and can operate the push button group 11*a*3 through the push sheet 91*d*2.

In addition, the socket portion 91*d*4 includes, on the rear surface side, the electrical connection portion 91*d*3 as a connector that is connected to the electrical connection portion 11*b* of the operation input device 11. On the front surface side of the socket portion 91*d*4, the battery socket 91*d*5 is provided, and the battery BT is detachable. The electrical connection portion 91*d*3 includes plural electrical contacts P3 corresponding to the plural electrical contacts P2 in the electrical connection portion 11*b* of the operation input device 11.

Figure 13:
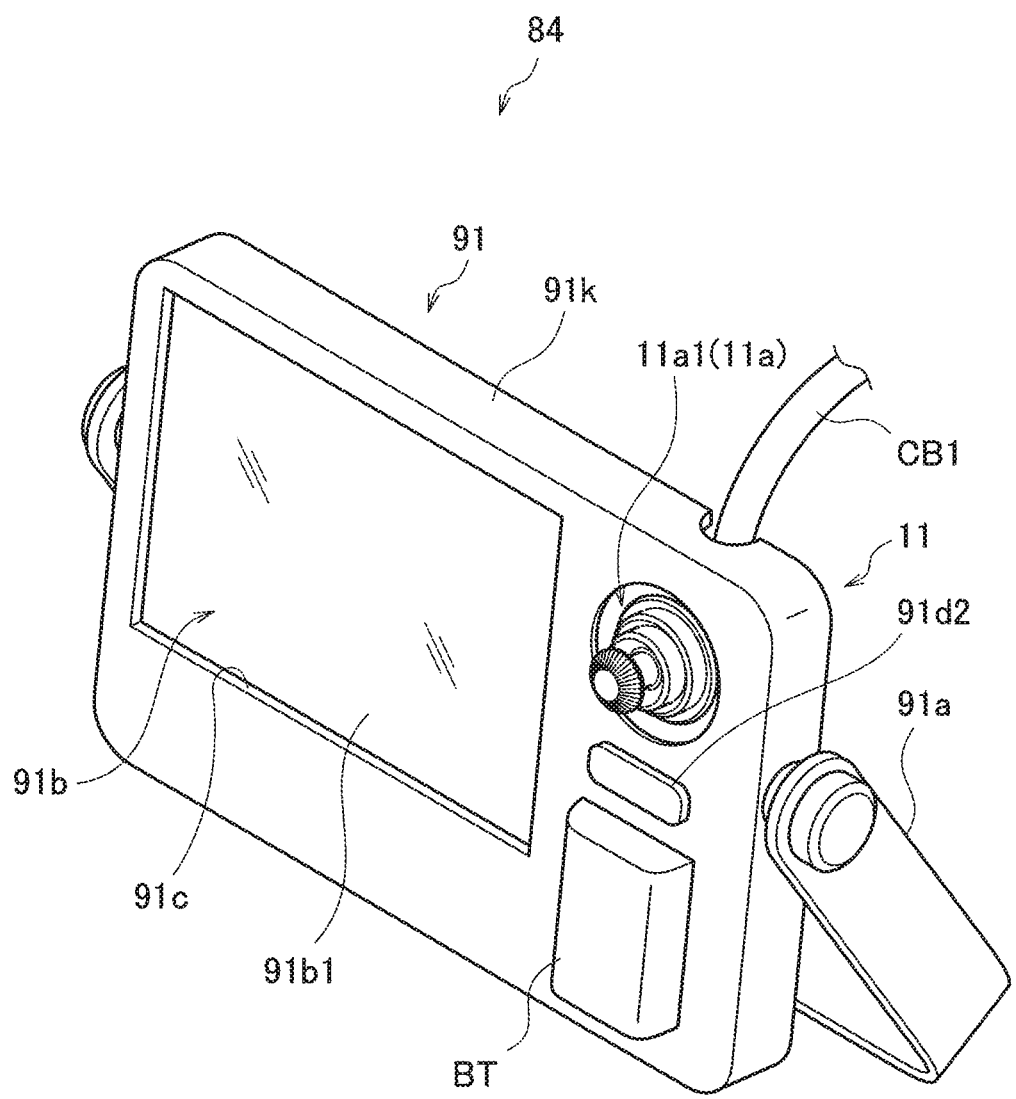
FIG. 13 is a perspective view illustrating an external appearance of a stationary centralized operation apparatus 84 which is another example of the centralized operation apparatus according to the embodiment.

By accommodating and mounting the operation input device 11 on the accommodation portion 91*d*, the stationary centralized operation apparatus 84 is configured. FIG. 13 is a perspective view illustrating the external appearance of the stationary centralized operation apparatus 84. As illustrated in FIG. 13, in the stationary centralized operation apparatus 84, the joystick 11*a*1 protrudes to the front through the opening portion 91*d*1 of the housing 91*k* such that the joystick 11*a*1 can be directly operated from the front side. The push button group 11*a*3 is positioned corresponding to the push sheet 91*d*2 and can be operated from the front side through the push sheet 91*d*2.

In addition, in the stationary centralized operation apparatus 84, the electrical connection portion 11*b* of the operation input device 11 and the electrical connection portion 91*d*3 of the image display device 91 are connected, the power of the battery BT is supplied to the operation input device 11 side, and an image signal generated by the camera device 71 is transmitted from the operation input device 11 side to the image display device 91 side.

A block diagram illustrating the electrical configuration of the image display device 91 is indicated by reference numerals in parentheses in FIG. 15. That is, in the stationary centralized operation apparatus 84, the power of the battery BT is supplied to the operation input device 11 side due to the connection between the electrical connection portion 11*b* of the operation input device 11 and the electrical connection portion 91*d*3 of the image display device 91. On the operation input device 11 side, an image signal received from the camera device 71 through the camera cable CB1 is transmitted to a controller CT91, and an image based on the image signal is displayed by the image display device 91*b*1 through a driver 91*b*3.

As a result, with the stationary centralized operation apparatus 84, the operator can observe an image captured by the camera device 71 on a relatively large screen of the image display device 91 while remotely operating the camera device 71 using the operation portion 11a.

Figure 14:
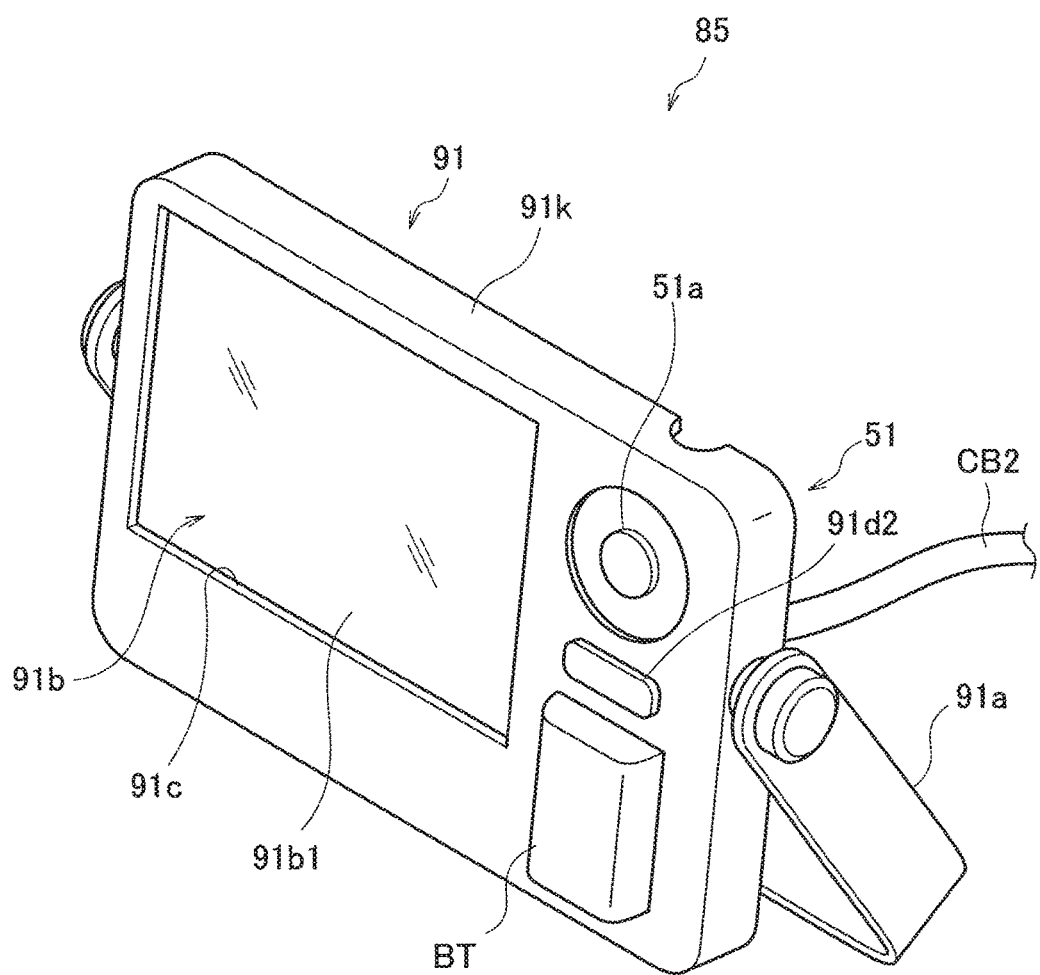
FIG. 14 is a perspective view illustrating an external appearance of a stationary image display unit 85 in which the adapter 51 is mounted on the image display device 91.

In addition, by accommodating and mounting the adapter 51 on the accommodation portion 91d, the stationary image display unit 85 illustrated in FIG. 4B is configured. FIG. 14 is a perspective view illustrating the external appearance of the stationary image display unit 85.

In a portion of the stationary image display unit 85 corresponding to the portion of the stationary centralized operation apparatus 84 illustrated in FIG. 13 where the joystick 11a1 protrudes, the cover 51a of the adapter 51 is exposed instead of the joystick 11a1. In addition, the push button group 11a3 corresponding to the push sheet 91d2 is not present. Accordingly, with the stationary image display unit 85, the operator can observe an image based on an image signal, which is received from the camera device 71 through the relay cable CB2, on a relatively large screen without remotely operating the camera device 71.

The operation input device 11, the image display devices 31 and 91, the handy centralized operation apparatus 81, and the imaging system SY which has been described above in detail have the following characteristics.

In the handy centralized operation apparatus 81, the operation input device 11 is accommodated and mounted on the image display device 31 instead of mounting the image display device 31 on the operation input device 11. In addition, the housing 11k of the operation input device 11 is formed such that a cross-sectional shape thereof is rectangular.

The operation input device 11 is accommodated in the image display device 31 such that the accommodation portion 31b1 of the image display device 31 surrounds the front surface 11k2 and the four side surfaces (the upper surface 11k1, the left side surface 11k3, the right side surface 11k4, and the lower surface 11k6) of the operation input device 11 except the rear surface 11k5 and such that the operation input device 11 is substantially surrounded by the image display device 31. As a result, the handy centralized operation apparatus 81 into which the image display device 31 and the operation input device 11 are integrated is tough and has a high drop impact strength.

In addition, in the handy centralized operation apparatus 81, the operation input device 11 is accommodated in the image display device 31. Therefore, even in a case where the image display device 31 includes a large-screen image display device and a larger housing than the operation input device 11, an integrated housing structure that is not likely to be broken can be obtained.

Furthermore, an engagement position between the engaging pieces 11f of the operation input device 11 and the engaging plates 31d of the image display device 31 is set at a position of the handy centralized operation apparatus 81 in the up-down direction corresponding to the joystick 11a1 to which the force of a finger of the operator is applied.

As a result, even in a case where the operation lever 11a2 is pressed to the rear side, which is the direction where the operation input device 11 is removed from the accommodation portion 31b1, by the operator operating the joystick 11a1, the force is received by the engaging plates 31d and the engaging pieces 11f without generating a moment. Therefore, in the handy centralized operation apparatus 81, the mounting between the image display device 31 and the operation input device 11 is not released by remote operation, and a high reliability can be obtained.

The handy image display device 31 and the operation input device 11 are integrated by mounting the operation input device 11 from a side (rear surface side) opposite to the side (front surface side) where the operation surface and the screen are present. As a result, the camera cable CB1 extending out from the upper surface of the operation input device 11 does not interfere with the display 31a of the image display device 31 during the mounting of the operation input device 11. Therefore, the operation input device 11 can be easily mounted.

In addition, in the handy centralized operation apparatus 81 in which the operation input device 11 is accommodated and mounted on the image display device 31, the camera cable CB1 extends out from the rear side with respect to the display 31a. As a result, the camera cable CB1 does not interfere with image observation. Therefore, the operator can observe an image satisfactorily.

In addition, in the handy centralized operation apparatus 81, a gap which is a boundary portion between the operation input device 11 and the image display device 31 is present on the rear surface side and is not exposed to the front surface. As a result, when the handy centralized operation apparatus 81 is used, rain drops or dust is not likely to infiltrate into the gap between the operation input device 11 and the image display device 31. Therefore, the handy centralized operation apparatus 81 can exhibit superior environment resistance and has a high reliability.

The present invention is not limited to the configurations of the above-described examples, and various modifications can be made without departing from the scope of the present invention.

In the example of the imaging system SY, the remote operation is performed by wire. However, communication between the operation input device 11 and the camera device 71 may be performed by wireless means instead of using the wired camera cable CB1. In this case, a power source of the camera device 71 is provided on the camera device 71 side separately from the battery BT. In a case where the remote operation is performed by wireless means, it is easy to apply the present invention to an unmanned aerial vehicle or a moving object.

The wireless communication may be established, for example, by providing an infrared transmitting and receiving device as a signal transmitting and receiving portion on the upper surface of the operation input device 11 and performing optical communication with an infrared transmitting and receiving device provided on the camera device 71 side. Even in this case, the operation input device 11 can be accommodated and mounted from the rear surface side of the image display device 31. In a case where the rear surface side of the display 31a of the image display device 31 interferes with an optical path of infrared light, the notch portion 31a3 may be provided to avoid the interference.

As a result, in the handy centralized operation apparatus 81, an optical path of infrared light for wireless communication does not cut off by the display 31a of the image display device 31. Therefore, it is easy to design the handy centralized operation apparatus 81, and the usability thereof is also superior.

The shape of the housing 11k of the operation input device 11 is not limited to the above-described shape having the wide portion 11kb. The housing 11k may be formed in a substantially rectangular parallelepiped shape of only the base portion 11ka as a whole. In addition, the front surface 11k2 of the housing 11k is not limited to the surface that is formed stepwise in the front-rear direction as described above by the upper portion and the lower portion. The housing 11k having the flat front surface 11k2 as a whole may be formed.

Accordingly, in a case where the front surface 11k2 is formed stepwise, the electrical connection portion 11b is attached to a surface facing in the same direction as the operation portion 11a. In a case where the front surface 11k2 is flat, the electrical connection portion 11b is attached to the same surface as the operation portion 11a.

The imaging system SY may be modified into an optimum mode depending on the use. For example, the imaging system SY may be configured to have heat resistance when used in a place near a heat source such as an observation of a rotation state of an engine.

When used in a dark place, the imaging system SY may be configured to include a light source on the operation input device 11 side and to project light from the camera device 71 to the object through an optical fiber that guides light from the light source to the inside of the camera cable CB1.

In addition, in order to observe the life of a bug or an animal, a sensor such as an infrared sensor may be provided in the camera device 71, and once the sensor detects that the bug or the animal approaches the camera device 71, the controller CT11 may control the camera device 71 to start imaging the bug or the animal.

The imaging system SY may be used as a so-called industrial endoscope by causing the camera device 71 to have substantially the same diameter as that of the camera cable CB1, causing the camera cable CB1 to be flexible, and causing a direction of the tip end of the camera device 71 to vary using the operation input device 11.

What is claimed is:

1. An operation input device comprising:
    a housing;
    an operation portion that is provided on a first surface of the housing and is operated to remotely operate an imaging device;
    a signal transmitting and receiving portion that is provided on a second surface of the housing connected to the first surface, and configured to transmit and receive a signal to and from the imaging device;
    a first electrical connection portion that is attached to the first surface of the housing or to a surface of the housing facing a same direction as the first surface, and configured to output the signal, which is received from the imaging device through the signal transmitting and receiving portion, to outside; and
    a pair of engaging pieces that are retractably provided at positions facing each other with the operation portion interposed therebetween, on a third surface and a fourth surface connected to both the first surface and the second surface.

2. An image display device comprising:
    a display that accommodates an image display device displaying an image;
    a main body that is integrally formed with the display;
    an accommodation portion that is formed to be recessed on a surface of the main body opposite to an image display side of the display, and accommodates an apparatus including a housing;
    an opening portion that is formed in the main body, and communicates between a space of the accommodation portion and a space on the image display side;
    a second electrical connection portion that is disposed on a bottom wall of the accommodation portion to input a signal of an image displayed by the image display device; and
    a pair of engaging plates that are provided at positions of edge portions of the accommodation portion in the main body between which the opening portion is interposed.

3. A centralized operation apparatus that is obtained by integrating the operation input device according to claim 1 and an image display device, and is capable of remotely operating the imaging device and displaying an image captured by the imaging device, the image display device comprising:
    a display that accommodates the image display device displaying the image;
    a main body that is integrally formed with the display;
    an accommodation portion that is formed to be recessed on a surface of the main body opposite to an image display side of the display, and accommodates an apparatus including a housing;
    an opening portion that is formed in the main body, and communicates between a space of the accommodation portion and a space on the image display side;
    a second electrical connection portion that is disposed on a bottom wall of the accommodation portion to input a signal of the image displayed by the image display device; and
    a pair of engaging plates that are provided at positions of edge portions of the accommodation portion in the main body between which the opening portion is interposed;
    wherein the operation input device is accommodated in the accommodation portion of the main body of the image display device,
    the operation portion of the operation input device protrudes to the space on the image display side through the opening portion of the image display device,
    the first electrical connection portion is connected to the second electrical connection portion, and
    the pair of engaging pieces engage with the pair of engaging plates such that the operation input device and the image display device are integrated.

4. An imaging system comprising:
    an imaging device;
    an operation input device comprising an operation portion for remotely operating the imaging device, and a first electrical connection portion for outputting an image signal of an image captured by the imaging device; and
    an image display device comprising display configured to receive the image signal output from the imaging device through the first electrical connection portion, and to display the image based on the image signal, wherein
    the image display device comprises:
    the display that accommodates the image display device;
    a main body that is integrally formed with the display;
    an accommodation portion that is formed to be recessed on a surface of the main body opposite to an image display side of the display and accommodates at least a part of the operation input device;
    an opening portion that is formed in the main body and communicates between a space of the accommodation portion and a space on the image display side; and
    a second electrical connection portion that is disposed on a bottom wall of the accommodation portion to input the image signal;
    and wherein
    at least a part of the operation input device is accommodated in the accommodation portion, the operation portion protrudes to the space on the image display side through the opening portion, the first electrical connection portion is connected to the second electrical connection portion, and the operation input device and the image display device configure a centralized operation apparatus that is capable of remotely operating the imaging device and displaying the image captured by the imaging device.

\* \* \* \* \*

UNITED STATES PATENT AND TRADEMARK OFFICE
CERTIFICATE OF CORRECTION

PATENT NO. : 10,362,209 B2
APPLICATION NO. : 15/884967
DATED : July 23, 2019
INVENTOR(S) : Hiromi Taguchi It is certified that error appears in the above-identified patent and that said Letters Patent is hereby corrected as shown below:

In the Claims

Claim 4, Column 18, Line 47, please delete the phrase "comprising display configured" and replace with "comprising a display configured".

Signed and Sealed this
Twenty-second Day of October, 2019

Andrei Iancu
*Director of the United States Patent and Trademark Office*